(12) United States Patent
Bezerra et al.

(10) Patent No.: US 8,632,089 B1
(45) Date of Patent: Jan. 21, 2014

(54) MECHANISM FOR CONVERTING RECIPROCAL MOTION TO ROTARY MOTION

(76) Inventors: Wilson X. Bezerra, Belleville, NJ (US); Silvana A. Bezerra, Belleville, NJ (US)

(*) Notice: Subject to any disclaimer, the term of this patent is extended or adjusted under 35 U.S.C. 154(b) by 328 days.

(21) Appl. No.: 12/932,589

(22) Filed: Mar. 1, 2011

Related U.S. Application Data

(60) Provisional application No. 61/309,561, filed on Mar. 2, 2010.

(51) Int. Cl.
*B62M 1/00* (2010.01)

(52) U.S. Cl.
USPC .......................................................... 280/252

(58) Field of Classification Search
USPC .................................. 280/236, 251, 252, 253
See application file for complete search history.

(56) References Cited

U.S. PATENT DOCUMENTS

| | | | | |
|---|---|---|---|---|
| 636,184 A * | 10/1899 | Roxendorff | ................... | 280/236 |
| 3,039,790 A * | 6/1962 | Trott | ............................ | 280/251 |
| 3,954,282 A * | 5/1976 | Hege | .............................. | 280/251 |
| 3,984,129 A * | 10/1976 | Hege | .............................. | 280/251 |
| 4,227,712 A * | 10/1980 | Dick | .............................. | 280/236 |
| 4,666,173 A * | 5/1987 | Graham | ........................ | 280/255 |
| 4,829,841 A * | 5/1989 | Ogawa | ............................ | 74/127 |
| 6,554,309 B2 * | 4/2003 | Thir | ............................... | 280/253 |
| 2006/0055144 A1 * | 3/2006 | Norman | ........................ | 280/251 |
| 2010/0320720 A1 * | 12/2010 | Bezerra et al. | ................ | 280/252 |

* cited by examiner

*Primary Examiner* — Paul N Dickson
*Assistant Examiner* — Daniel Yeagley

(57) ABSTRACT

A mechanism for converting reciprocal motion to rotary motion. A pair of driving members are mounted to undergo reciprocal up-and-down movement about a first axis. A pair of driving chains are drivingly connected to the respective driving members so that reciprocal up-and-down movement of the driving members transmits respective driving forces to the driving chains. A driven member is mounted for undergoing rotational motion in one direction of rotation about a second axis different from the first axis. A drive unit transfers, via the driving forces of the driving chains, reciprocal up-and-down movement of the driving members to rotational motion of the driven member in the one direction of rotation.

2 Claims, 35 Drawing Sheets

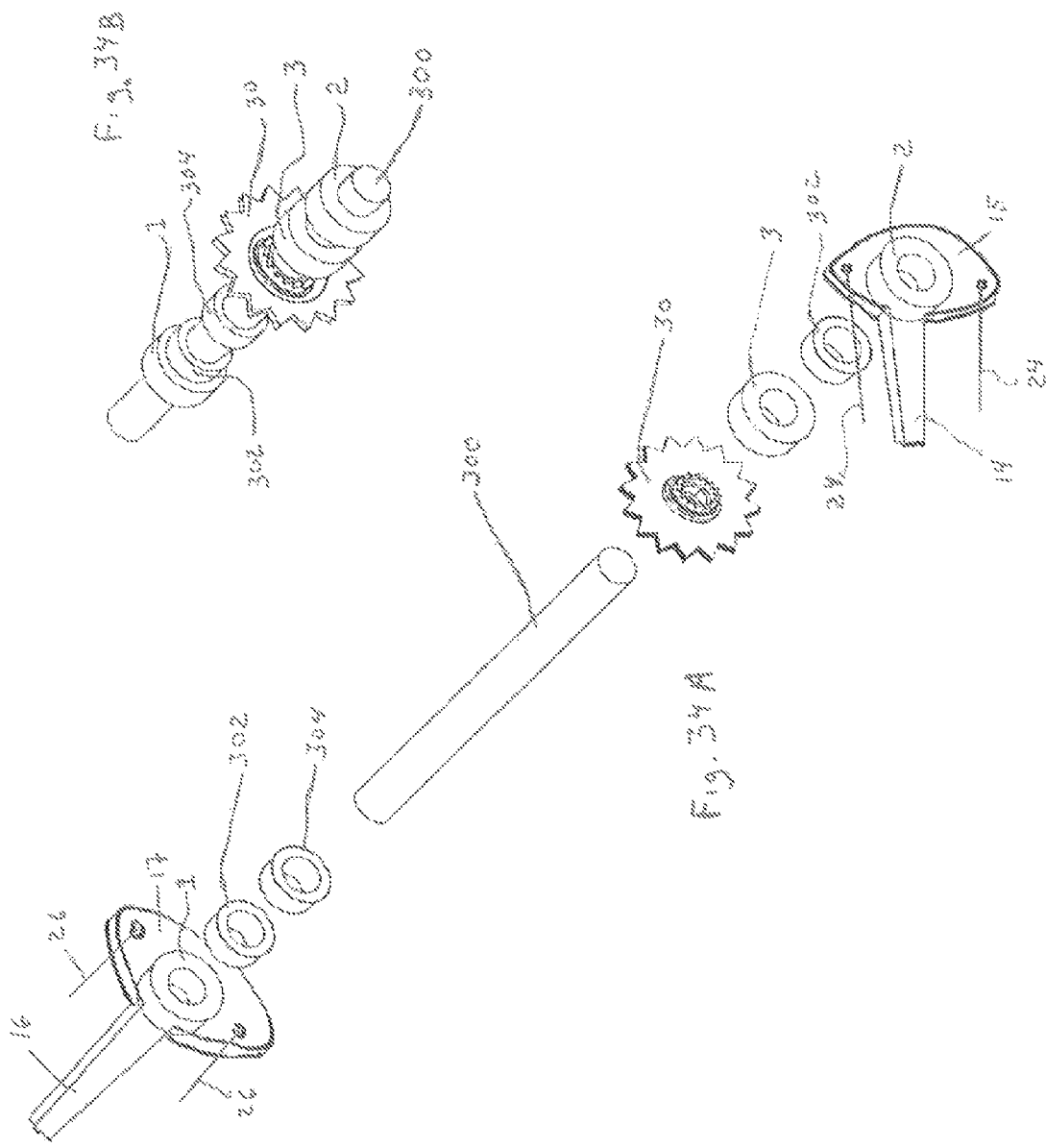

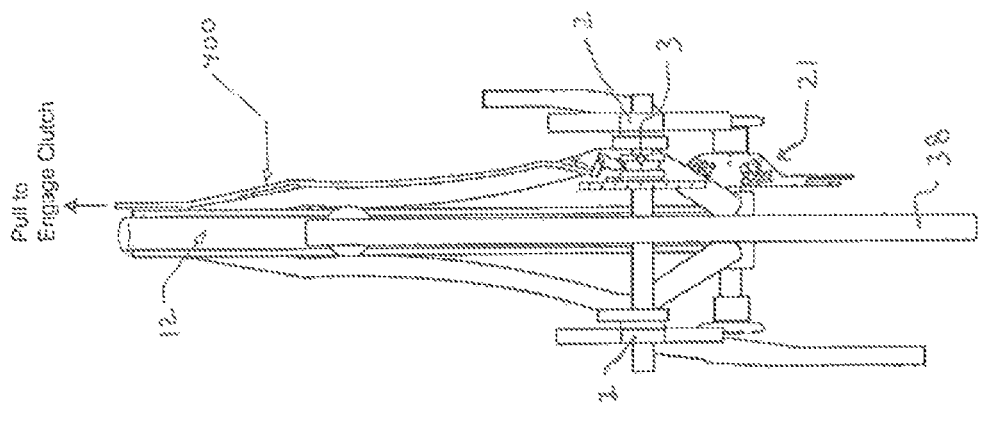
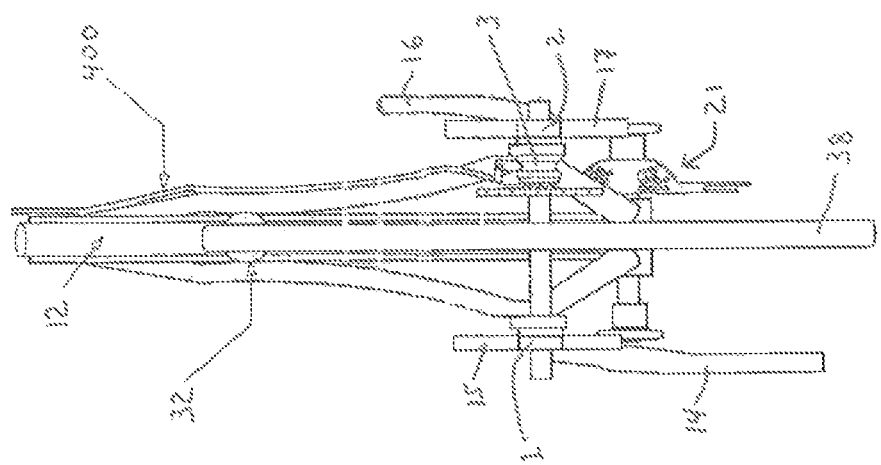

MECHANISM FOR CONVERTING RECIPROCAL MOTION TO ROTARY MOTION

RELATED APPLICATION

The present application claims the benefit of U.S. Provisional Application No. 61/309,561 filed Mar. 2, 2010 which is incorporated herein by reference in its entirety

BACKGROUND OF THE INVENTION

1. Field of the Invention

The present invention relates to motion transfer mechanisms, and more specifically to a mechanism that converts reciprocal motion to rotary motion and which is particularly suited for rider-propelled vehicles, exercise apparatus and the like.

2. Background Information

Over the years, a wide variety of rider-propelled vehicles and exercise apparatus have been devised. Among the more popular rider-propelled vehicles are bicycles, small recreational cars, paddle boats, light-weight airplanes and other similarly operated vehicles. Conventional exercise apparatus for physical conditioning of the human body include stair climbers, stationary bicycles and other physical conditioning devices.

In many conventional rider-propelled vehicles, and most notably bicycle or other similarly operated vehicle, a mechanism for propelling the vehicle incorporates an axle located approximately midway between the front and rear wheels. Shafts extend perpendicularly from the axle, and pedals project from the end of the shafts outwardly from the bicycle. The pedals permit the rider to utilize the propulsive power generated by the human body. The axle typically carries a sprocket that engages a chain for driving the rear wheel, which propels the vehicle forward. Thus, the arrangement of the axle, shaft and pedals forces the rider to move his or her feet and legs in a circular pedaling motion. Although this circular motion is effective in creating sufficient force to propel the vehicle forward, it does not do so efficiently.

The circular pedaling motion required of the conventional propelling mechanism results in lost motion and wasted energy. The driving force that propels the vehicle is developed from the downward push of the riders' legs and feet along the circular path of travel of the pedals, and the circular path makes it difficult for the rider to exert a constant propulsive force. As a result, the rider is not able to pace himself or herself during a long journey. Additionally, the smoothness of operation of the vehicle is compromised since the transmission of force depends on the position of the pedals during their cycle of rotation, resulting in non-uniform transmission of force. Since the non-uniformity of the force transmission is independent of the speed of the vehicle, the non-uniformity is especially pronounced at low speeds.

Moreover, as opposing pedal shafts are displaced from one another by 180 degrees, every 360 degrees rotation of the drive sprocket includes two "dead spots" at which the pedal shafts are simultaneously in the vertical position. As can be appreciated, no productive force can be applied to the pedals when the pedal shafts are in such vertical position. In addition to generally providing an inefficient path of movement for the pedals, the conventional propelling mechanism permits the production of only a limited degree of torque and/or power as the sizes of the pedal shafts, sprocket and other components must be limited to accommodate design specifications. For instance, on a bicycle, it is desirable to position the seat of a bicycle as close to the ground as possible given the height of the individual for whom the bicycle is designed. Thus, as the sprocket is located substantially directly beneath the seat, the lengths of such person's legs require that the sprocket be even closer to the ground. As a consequence, the length of the pedal shafts must be limited so that the ground does not interfere with the movement of the pedals at the bottom of the power stroke.

Another shortcoming of conventional propelling mechanisms relates to the necessarily short arm on which pedals are normally mounted. The typical arm length is in the order of 6½ to 7 inches. It is well known that a greater torque moment can be generated by using a given amount of force over a longer moment arm.

Thus conventional mechanisms for converting rotary motion are pedals to rotary motion of a driven wheel has the drawbacks of ineffective transmission of force, poor mechanical advantage, low power output and high resistance. Rider-propelled vehicles equipped with such a conventional mechanism thus require the application of substantial force in order for the rider to propel the vehicle, particularly when starting up or accelerating.

Similarly, exercise apparatus employing a conventional motion converting mechanism suffer many deficiencies including the inefficient application of muscle strength from the human body to the object of the exercise as well as lost power transference.

In view of the foregoing, mechanisms have been proposed for rider-propelled vehicles and exercise apparatus which are driven by reciprocal upward and downward motion of levers so that force is applied during the full stroke of the levers from a top to a bottom position. However, the transmission of the reciprocal motion of the levers to drive the rider-propelled vehicle or the exercise apparatus has not been satisfactory. Although such mechanisms overcome the above noted varying torque problem, they have an unduly complicated construction as well as add substantial weight to the mechanisms.

Moreover, most rider-propelled vehicles and exercise apparatus driven by upward and downward motion of levers are designed for use only by relatively strong and agile persons. As a consequence, the vehicle and exercise apparatus have certain features which render them difficult or impractical to use by many persons, such as persons having less than average agility or strength.

The present invention overcomes many of the disadvantages inherent in the foregoing prior art motion converting mechanisms by providing a mechanism which simply and efficiently transfers reciprocal motion to rotary motion in a manner which avoids unduly complicated driving systems and the attendant substantial increase in weight.

SUMMARY OF THE INVENTION

It is an object of the present invention to provide a mechanism for converting reciprocal motion to rotary motion in a manner which avoids the drawbacks and disadvantages of prior constructions.

It is another object of the present invention to provide a mechanism wherein reciprocal motion applied to pivoted levers is effectively converted to rotary motion of an output member without requiring the application of substantial force.

It is another object of the present invention to provide a mechanism for converting reciprocal motion to rotary motion to propel a rider-propelled vehicle, characterized by a smooth and uniform transmission of force independent of the speed of the vehicle.

It is another object of the present invention to provide a mechanism for converting reciprocal motion to rotary motion to propel a rider-propelled vehicle, in which the transmission of force and the mechanical advantage are improved to reduce the effort which must be expended by the rider.

It is still another object of the present invention to provide a mechanism for converting reciprocal motion to rotary motion, wherein reciprocal motion of a pair of pivotal levers is transferred to rotary motion to propel a rider-propelled vehicle or to operate an exercise apparatus with efficient transfer of applied power and reduced resistance to power transfer.

It is still another object of the present invention to provide a mechanism for converting reciprocal motion to rotary motion, in a manner which avoids unduly complicated driving systems and the attendant substantially increase in weight.

The foregoing and other objects of the present invention are carried out by a mechanism for converting reciprocal motion to rotary motion. The mechanism comprises at least one driving member for undergoing reciprocal motion about a first axis, at least one rotary member for undergoing angular displacement about a second axis, means interconnecting the driving member to the rotary member such that reciprocal motion of the driving member effects angular displacement of the rotary member about the second axis in first and second opposite directions of rotation, at least one driven member for undergoing rotary motion in the first direction of rotation about the second axis, and means for converting angular displacement of the rotary member in either the first or second direction of rotation to rotary motion of the driven member in the first direction of rotation.

In another embodiment, the mechanism comprises a first driving member for undergoing reciprocal motion about a first axis, a first rotary member drivingly connected to the first driving member so that reciprocal motion of the first driving member about the first axis effects angular displacement of the first rotary member about a second axis, a first driven member for undergoing rotary motion in one direction of rotation about the second axis, a first unidirectional clutch mechanism drivingly connecting the first rotary member to the first driven member for converting angular displacement of the first rotary member to rotary motion of the first driven member in said one direction of rotation, a second driving member for undergoing reciprocal motion about the first axis, a second rotary member drivingly connected to the second driving member so that reciprocal motion of the second driving member about the first axis effects angular displacement of the second rotary member about the second axis for undergoing rotary motion in said one direction of rotation about the second axis, and a second unidirectional clutch mechanism drivingly connecting the second rotary member to the first driven member for converting angular displacement of the second rotary member to the rotary motion of the first driven member in said one direction of rotation.

In another aspect, the present invention comprises a rider-propelled vehicle.

BRIEF DESCRIPTION OF THE DRAWINGS

The following detailed description of the preferred embodiments of the invention will be better understood when read in conjunction with the accompanying drawings. For the purpose of illustrating the invention, there is shown in the drawings embodiments which are presently preferred. It should be understood, however, that the invention is not limited to the precise arrangements and instrumentalities shown. In the drawings:

FIG. 34A shows an exploded view of the rear drive axle.

FIG. 34B shows an assembled view of the rear drive axle.

FIG. 35A shows a back view with the third clutch being disengaged from the rear drive axle cassette sprocket of the rear drive axle.

FIG. 35B shows a back view with the third clutch engaged with the rear drive axle cassette sprocket of the rear drive axle.

LIST OF COMPONENTS

Figure 1:
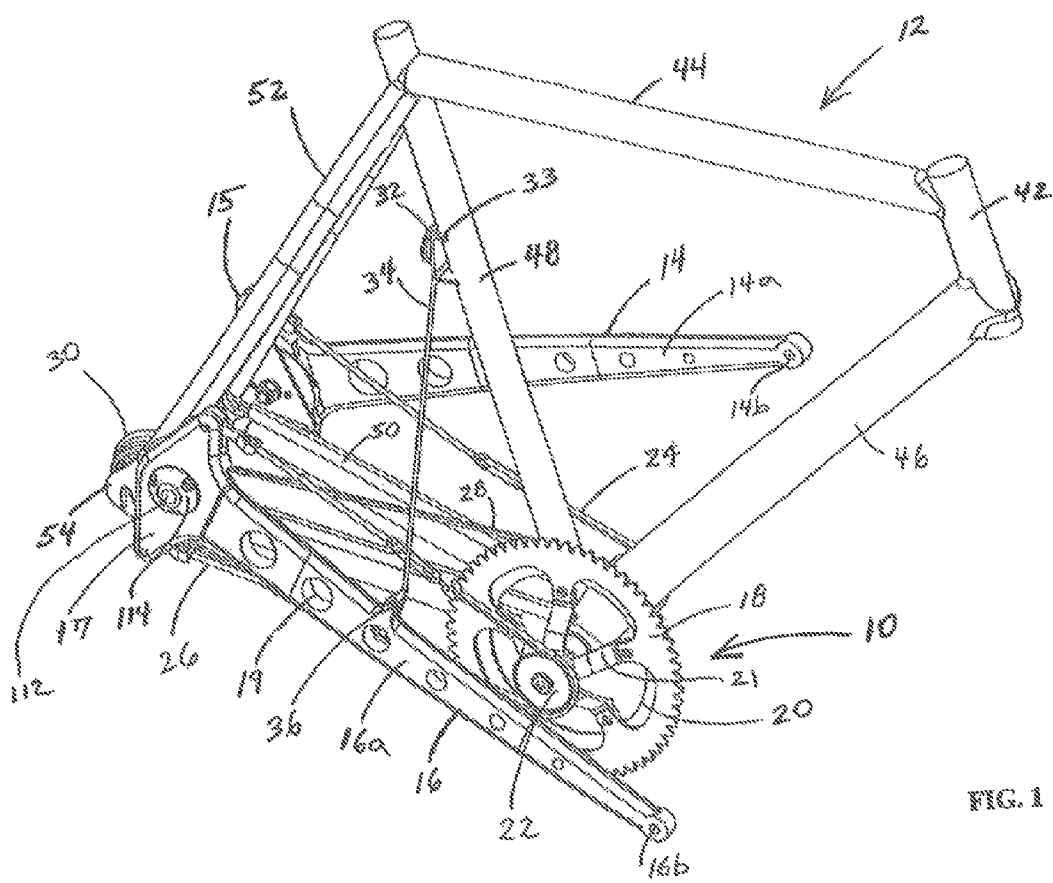
FIG. 1 is a perspective view of a rider-propelled vehicle in the form of a stepper bicycle incorporating the mechanism for converting reciprocal motion to rotary motion (hereinafter "motion transfer mechanism") according to the present invention. Certain components of the bicycle (e.g., tires, seat, brakes, and handlebar) are omitted for clarity purposes only.

10—Mechanism for converting reciprocal motion to rotary motion.
12—Bicycle frame.
13—Bicycle.
14—Left crank arm (lever).
14a—Elongated portion of left crank arm.
14b—Opening in left crank arm for supporting pedal.
15—Left pendulum.
16—Right crank arm (lever).
16a—Elongated portion of right crank arm.
16b—Opening in right crank arm for supporting pedal.
17—Right pendulum.
18—Front chain sprocket (54 teeth).
19—Weight reducing holes in crank arms.
20—Front chain sprocket (48 teeth).
21—Sprocket holder.
22—Right cog unit.
23—Left cog unit.
24—Left stepper chain.
26—Right stepper chain.
27—Chain sprocket axial bore.
28—Transmission chain.
30—Rear wheel sprocket.
32—Pulley wheel.
33—Pulley wheel bracket.
34—Pulley wire.
35—Pulley assembly bolt.
36—Pulley wire holder.
37—Front bicycle wheel.
38—Rear bicycle wheel.
40—Crank arm mounting bracket.
42—Frame head tube.
44—Frame top tube.
46—Frame down tube.
48—Frame seat tube.
50—Frame chain tube stays.
52—Frame seat tube stays.
54—Frame seat tube stay end.
55—Frame housing.
56—Frame housing axial bore.
58—Drive unit.
60—Rotary shaft.
61—Right end portion of rotary shaft.
62 to 108—Components of drive unit 58.
110—Crank arm mounting plate.
112—Crank arm bolt screw.
114—Crank arm cap.
116—Crank arm mounting plate ring.
118—Crank arm bearing.
120—Crank arm nut.
122—Rotational axis of cog units 22, 23.
124—Pivoting (fulcrum) first axis of crank arm pendulum.
300—rear drive axle.
302—rear drive axle roller bearings.
304—rear wheel rim roller bearing.
1, 2, 3—drive axle clutches.
400—clutch control cable.

DETAILED DESCRIPTION OF THE PREFERRED EMBODIMENTS

While this invention is susceptible of embodiments in many different forms, this specification and the accompanying drawings disclose only one specific form as an example of the use of the invention. The invention is not intended to be limited to the embodiment so described, and the scope of invention will be pointed out in the appended claims.

The preferred embodiment of the motion transfer mechanism 10 according to the present invention is described below with a specific application to a rider-propelled vehicle 13, particularly a stepper bicycle. However, it will be appreciated by those of ordinary skill in the art that the following preferred embodiment of the motion transfer mechanism 10 is also particularly well adapted for other rider-propelled vehicles 13 such as, for example, tricycles, small recreational cars, paddle boats, light-weight airplanes, tandem vehicles and other similarly operated vehicles. It will also be appreciated by those of ordinary skill in the art that the preferred embodiment described below is not limited for specific use in rider-propelled vehicles, but may also be employed in other apparatus requiring the conversion of reciprocal motion to rotary motion. For example, the preferred embodiment of the mechanism 10 is also particularly well adapted for exercise apparatus such as, for example, stair climbers, treadmills and other physical conditioning devices.

Certain terminology is used in the following description for convenience only and is not intended to be limiting. The words right, left, front, rear, upper, lower, inner, outer, rearwardly and forwardly designate directions in the drawing to which reference is made. Such terminology includes the words above specifically mentioned and words of similar import.

Referring now to the drawings in detail, wherein like numerals are used to indicate like elements throughout, there is shown in FIGS. 1-32 an embodiment of a motion transfer mechanism, generally designated at 10, according to the principles of the present invention, mounted on a frame of a bicycle, generally designated at 12 and 13, respectively.

As best shown in FIGS. 1-4, frame 12 includes a head tube 42, a top tube 44, a down tube 46, a seat tube 48, chain stays 50 extending rearwardly from a junction of the down tube 46 and the seat tube 48, and seat tube stays 52 extending rearwardly and downwardly from the seat tube 48 and terminating in stay ends 54 to which a rear wheel 38 of conventional type is journalled via a rear wheel sprocket 30 (sprocket wheel). A front wheel 37 of conventional type is joined in a front fork (not shown) extending downwardly from head tube 42 via a front wheel sprocket (not shown). A handlebar (not shown) is connected to the front fork via head tube 42 for manual steering of front wheel 37, and a seat or saddle (not shown) is mounted atop seat tube 48. Mounting brackets 40 are integrally connected (e.g., by welding, brazing, bonding, or suitable fasteners) to frame 12 at respective angular junctions between respective chain tube stays 50 and seat tube stays 52 for supporting crank arms (levers or driving members) 14, 16 of the motion transfer mechanism as further described below.

The frame components for bicycle 13 are preferably formed of aluminum, titanium or chromium-molybdenum alloy, such as that marketed under the trademark CHROMALLY. However, it is understood by those skilled in the art that other materials, such as carbon fibers and composite materials, which exhibit high strength and light weight characteristics, are suitable for the frame components. Furthermore, it is understood that the dimensions of frame 12 are selected so that the rider, seated upon the seat, can conveniently reach and apply a driving force to the forward ends of crank arms 14, 16.

Figure 17:
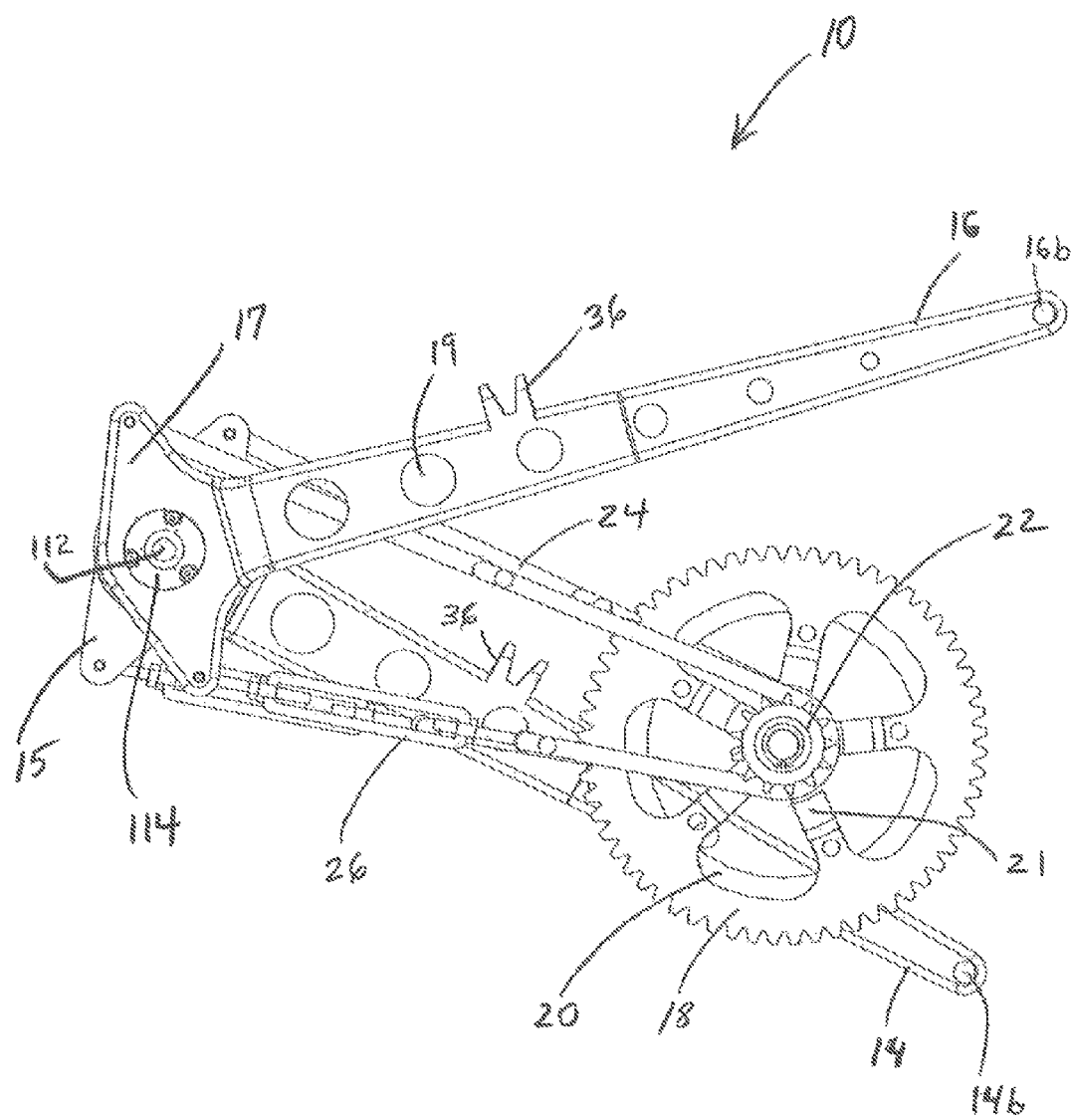
FIG. 17 is a right-side view of the motion transfer mechanism of the invention.
Figure 18:
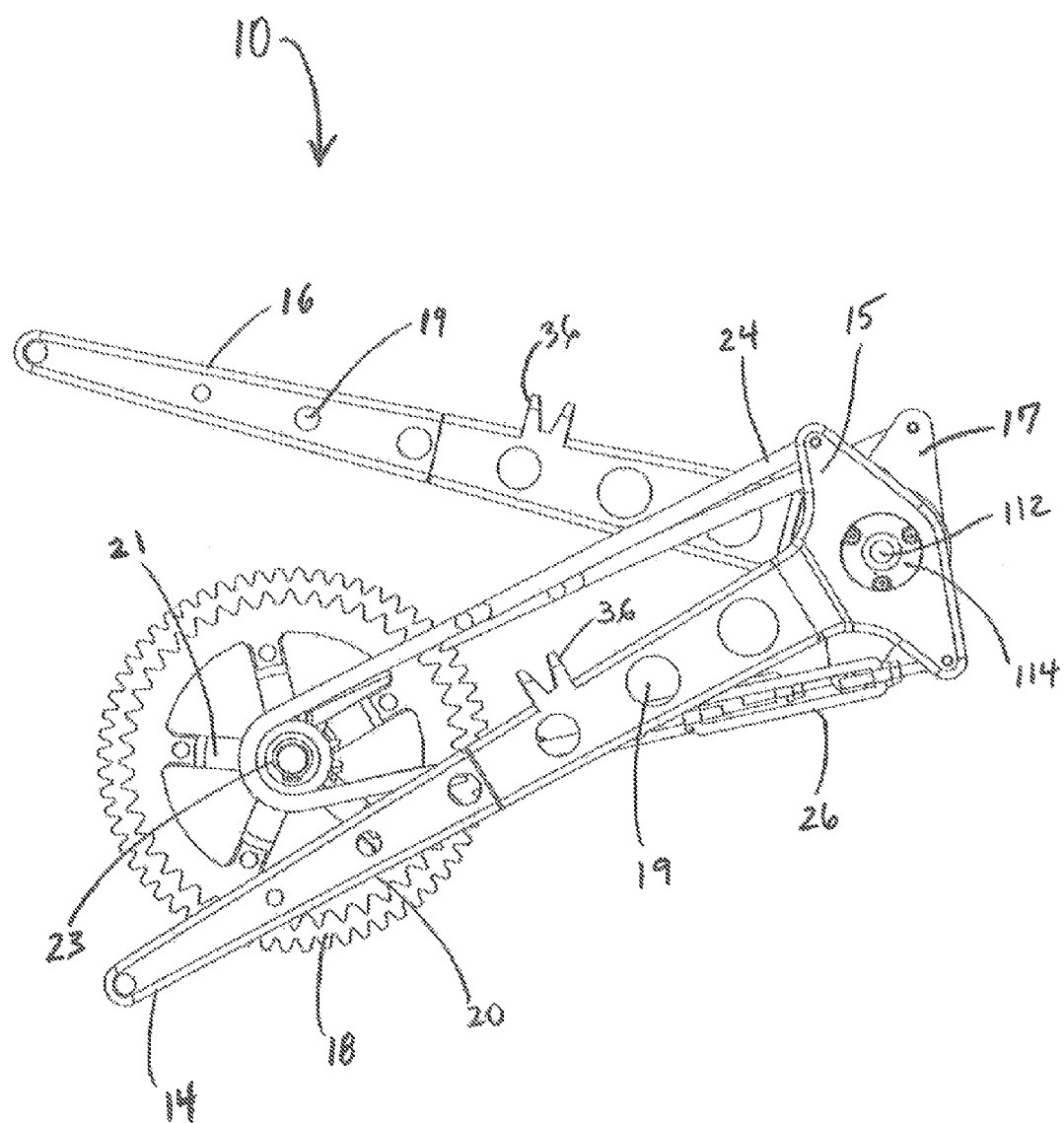
FIG. 18 is a left-side view of the motion transfer mechanism of the invention.
Figure 19:
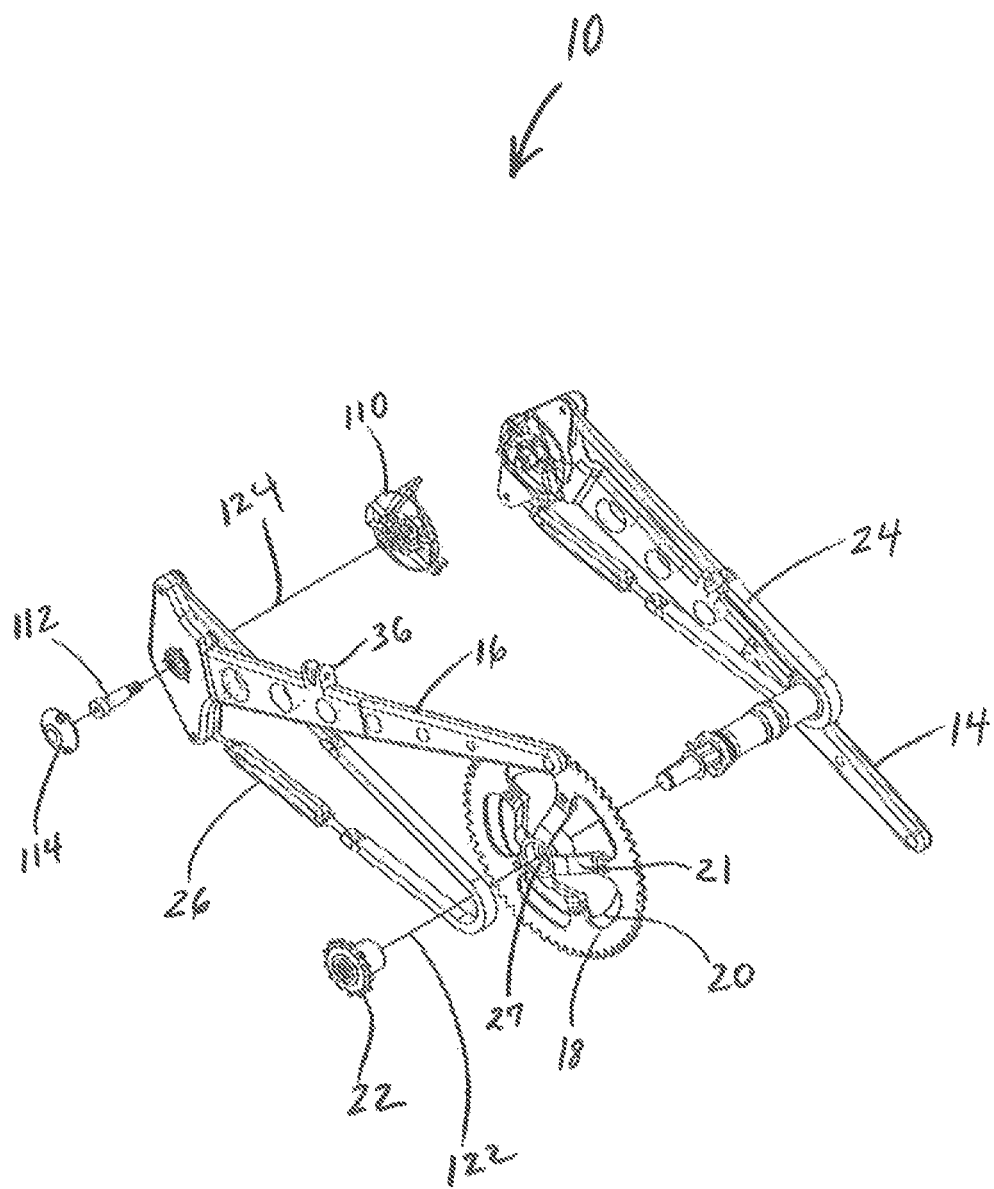
FIG. 19 is a partial exploded perspective view of the motion transfer mechanism of the invention.
Figure 20:
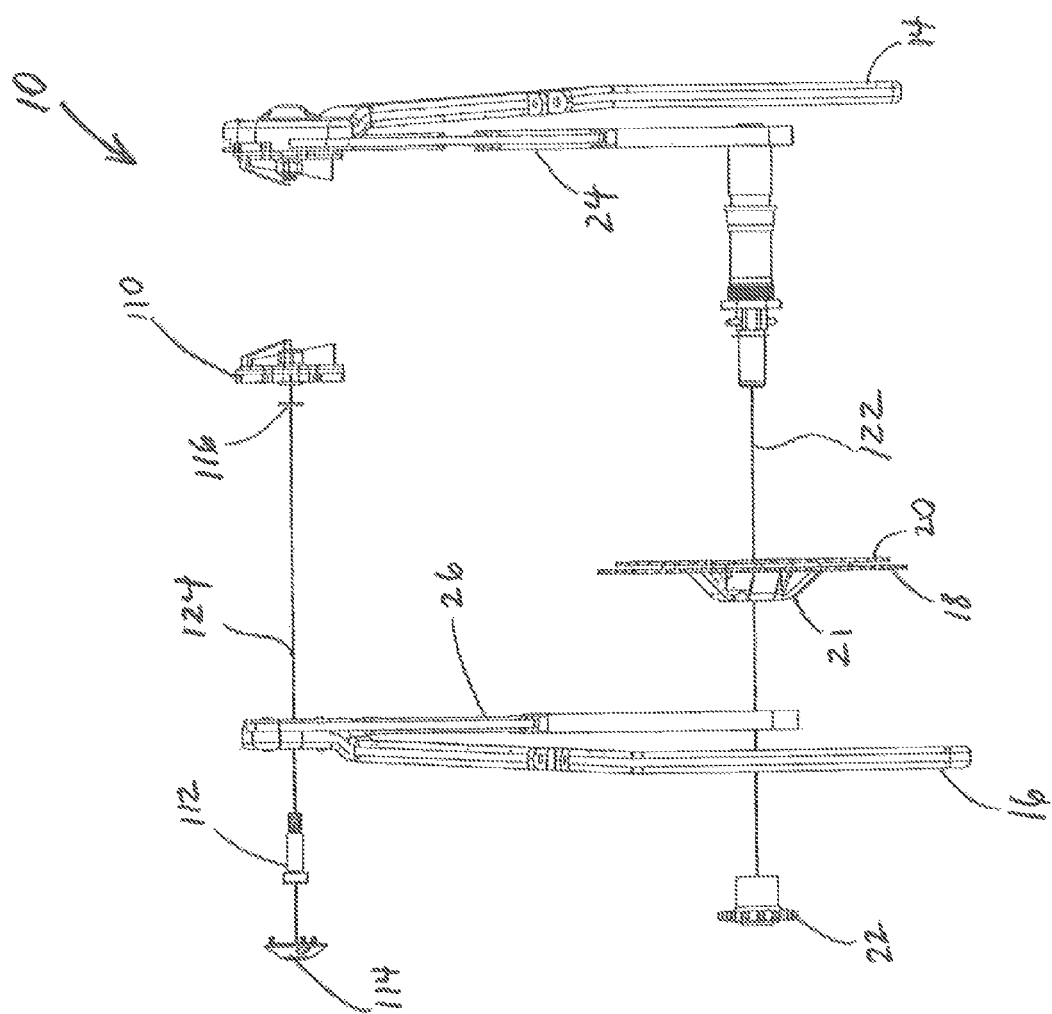
FIGS. 20-22 show top, bottom and front perspective views, respectively, of the motion transfer mechanism of the invention.
Figure 21:
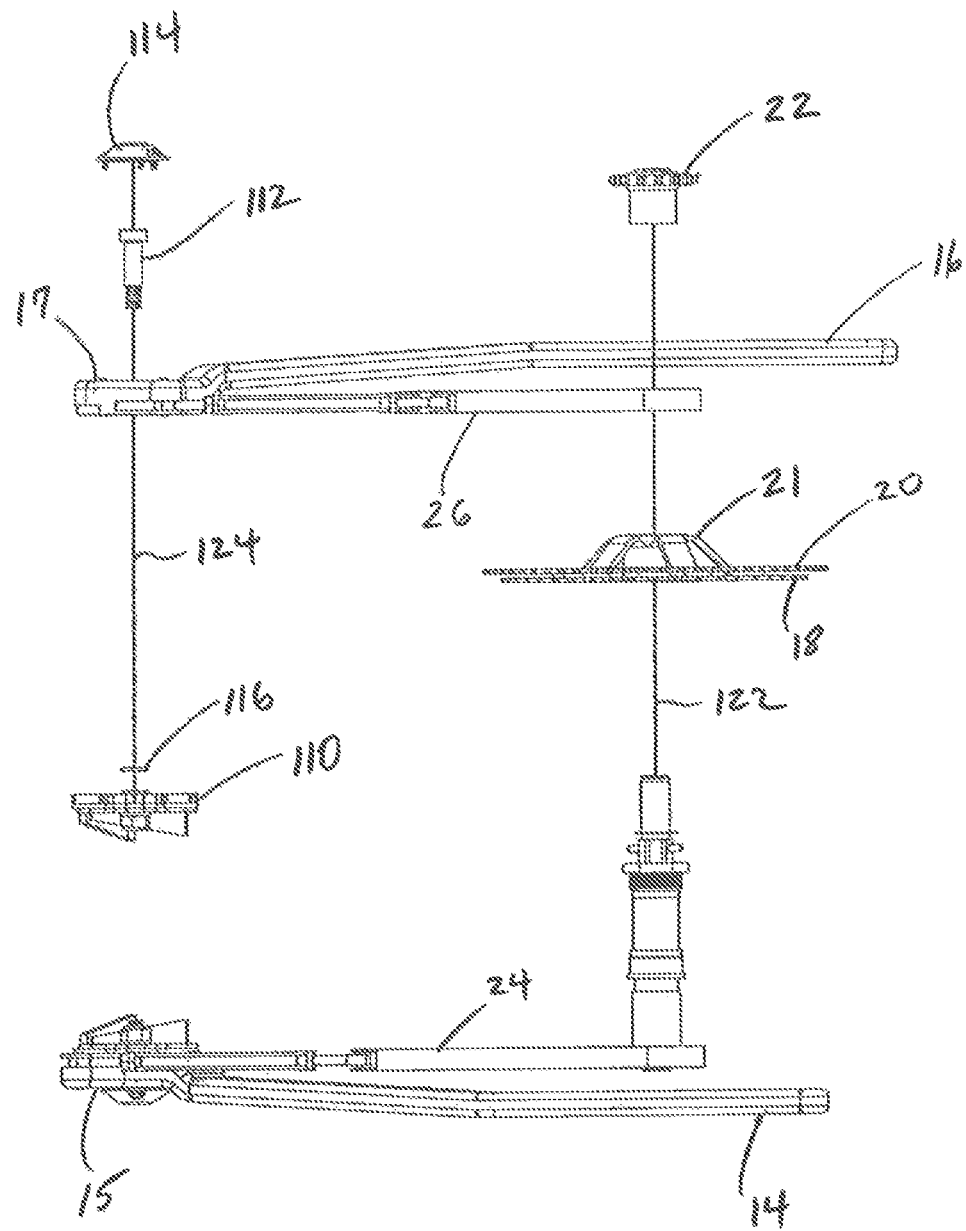
Figure 22:
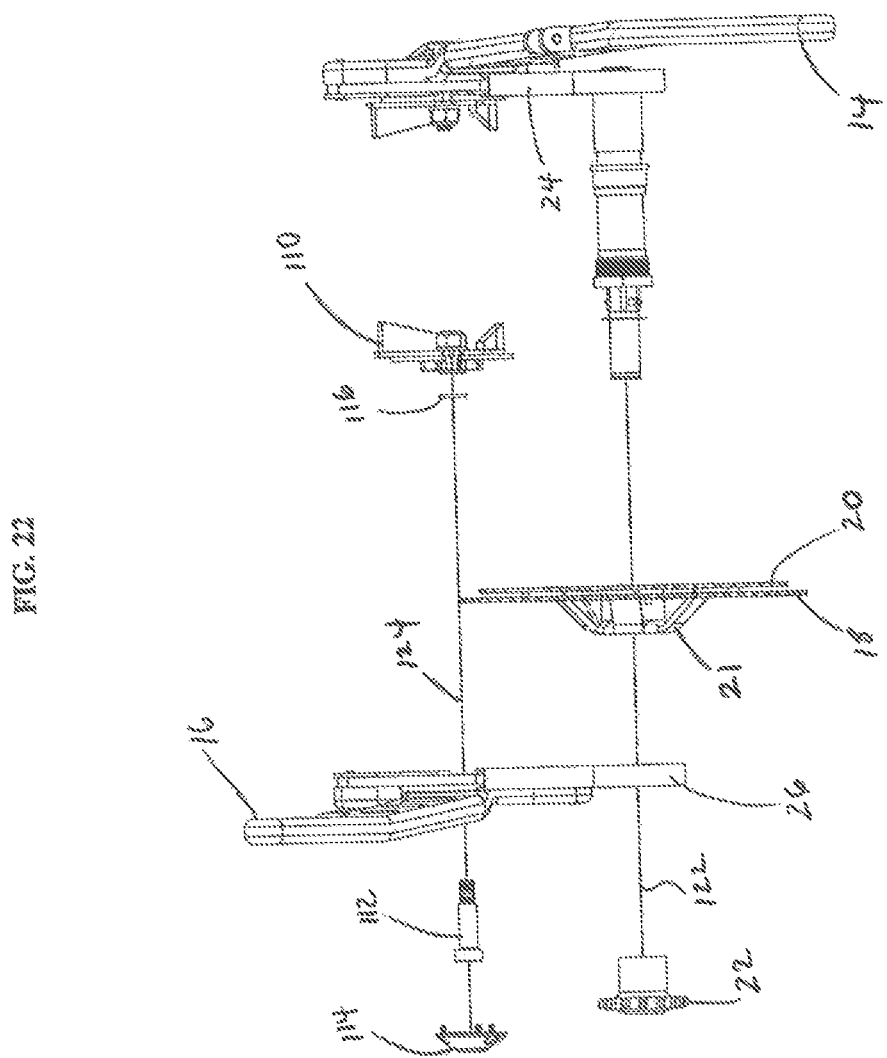
Figure 23:
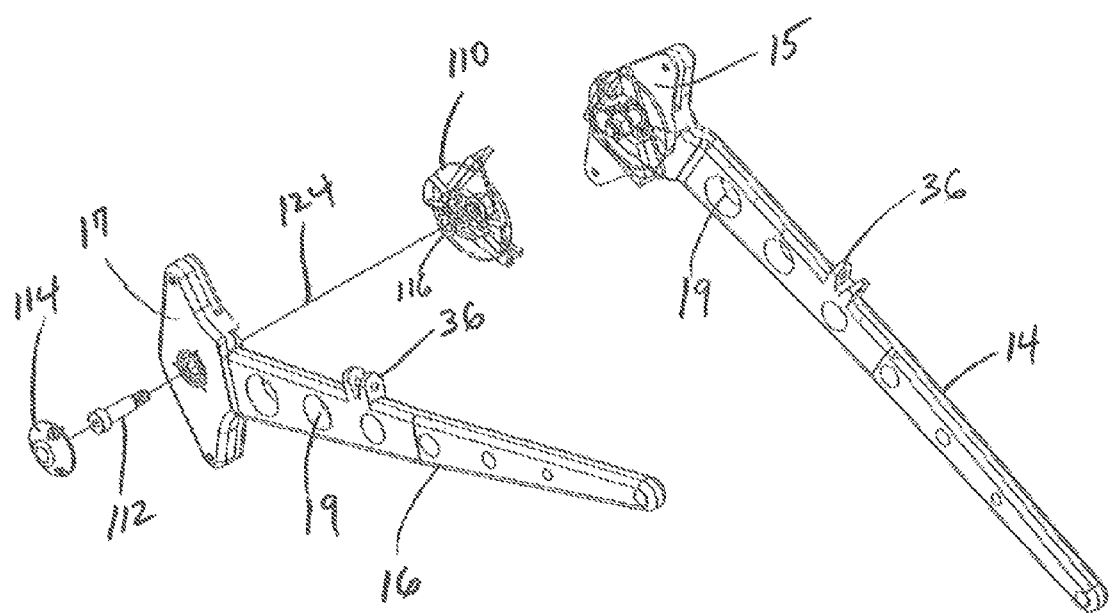
FIGS. 23-25 are partial exploded views of the crank arms in the motion transfer mechanism of the invention.
Figure 24:
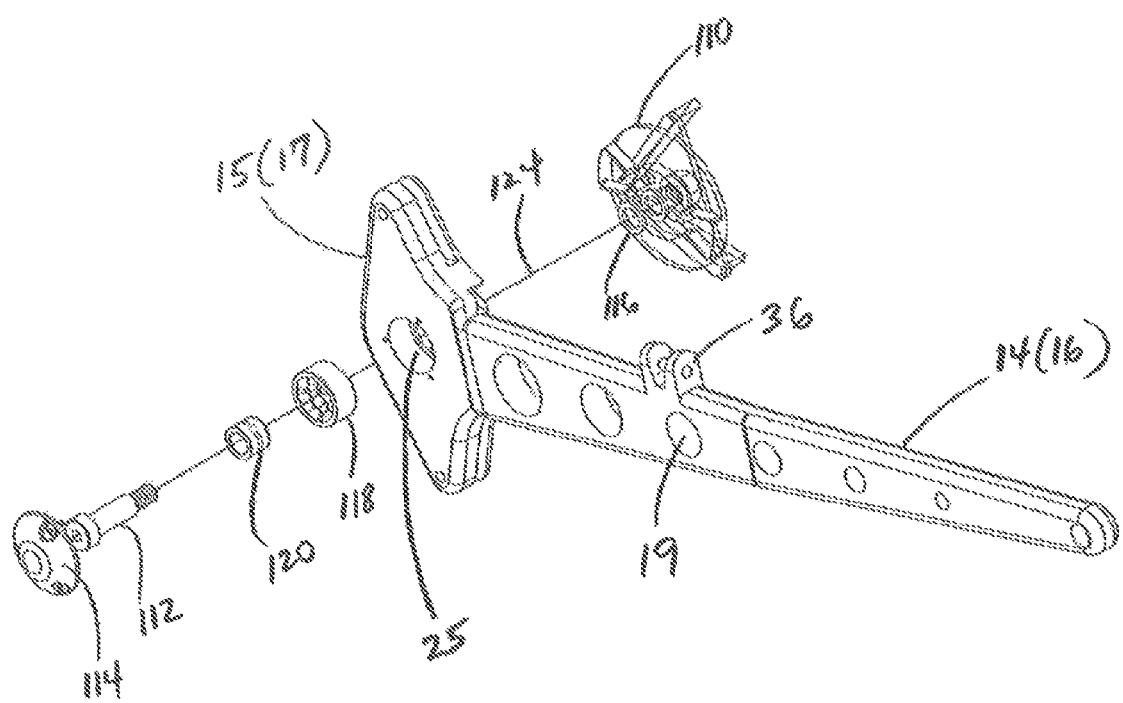
Figure 25:
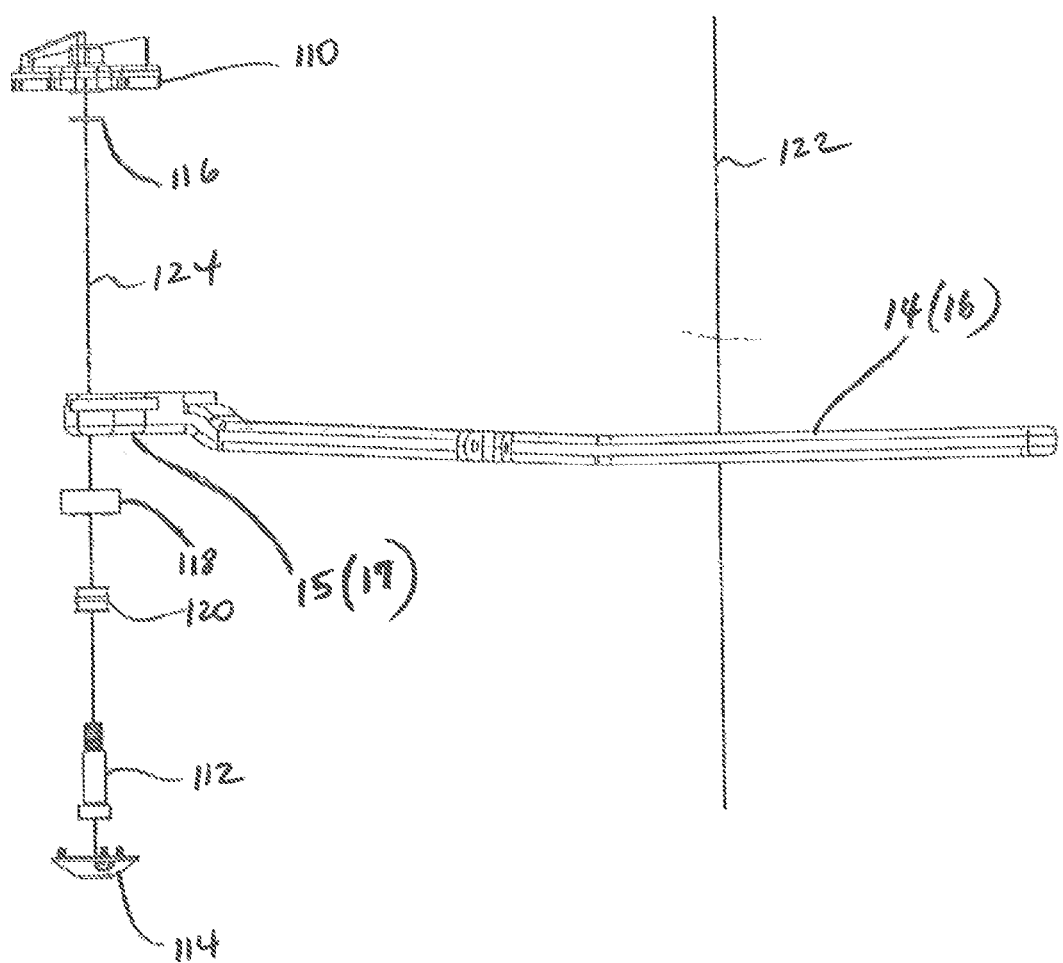

FIGS. 1, 2 and 6-11 depict various views of the motion transfer mechanism 10 mounted on bicycle frame 12. FIGS. 12-16 depict various exploded views of the motion transfer mechanism 10 mounted on the bicycle frame 12. FIGS. 17-18 depict right and left side views; respectively, of the motion transfer mechanism 10. FIGS. 19-22 depict various exploded views of the motion transfer mechanism 10. FIGS. 23-25 depict exploded views of left and right crank arms (levers or driving members) 14, 16. FIGS. 26-32 depict various views full and exploded views of a drive unit 58 that forms part of the motion transfer mechanism 10 for converting reciprocal motion to rotary motion.

The motion transfer mechanism 10 comprises left and right crank arms (levers or driving members) 14, 16 mounted on the frame 12 for reciprocal up-and-down movement, a return mechanism 32, 34 coupling crank arms 14, 16 for synchronous reciprocal up-and-down movement about a rotational axis 124 (first axis), and a drive unit 58 mounted on frame 12 for transferring, via chain sprockets 18, 20 (driven member), stepper chains (driving chains) 24, 26 and transmission chain 28, reciprocal up-and-down motion of crank arms 14, 16 about the pivoting axis 124 to rotational motion of the rear wheel 38 of the bicycle 13 in one direction of rotation to propel the bicycle 13 forward.

The left and right crank arms (levers or driving members) 14, 16 have front end rear end portions terminating; respectively, in front end rear ends and being configured for coupling to bicycle frame 12 for up-and-down movement. The rear ends of crank arms 14, 16 form respective pendulums 15, 17 which have generally V-shaped configurations and which connect to respective mounting brackets 40 on the frame 12 for pivotal movement about pivoting axis 124. Elongated portions 14a, 16a extend forwardly from respective rear end portions of the crank arms 14, 16. The elongated arm portions 14a, 16b have suitable openings 19 to reduce the weight of the arm portions while retaining the strength thereof. The front ends of the crank arms 14, 16 are provided with respective openings 14b, 16b for supporting a pedal (not shown).

As shown in FIGS. 19-25, crank arms 14, 16 are generally mounted to respective mounting brackets 40 via a mounting plate assembly 110, 116 and bolt screw 112. The pendulum 15, 17 of each crank arm 14, 16 has a through-bore 25 supporting therein a rotary bearing assembly 118, and retaining nut 120 to enable pivot movement of the crank arms about the pivoting axis 124. The bolt screw 112 extends through the through-bore 25 and bearing assembly 118, and couples to the retaining nut 120 and connects to mounting bracket 40 of frame 12 via mounting plate assembly 110, 116. A cap 114 is fastened to each pendulum 15, 17 so as to cover the through-bore 25, bolt screw 112 and bearing assembly 118.

Preferably, the crank arms 14, 16 are formed of aluminum. However, it is understood by those skilled in the art that other constructions and materials are suitable for the crank arms. For example, the crank arms may be of solid construction and formed of other materials exhibiting a high ratio of strength to weight, such as a metal matrix, carbon fibers or composite materials.

The crank arms 14, 16 are interconnected with the drive unit 58 that is mounted on the bicycle frame 12 by a transmission unit (FIG. 32) for transferring reciprocal up-and-down motion of crank arms 14, 16 about (a first rotational) pivoting axis 124 rotationally fixed to the frame of the bicycle or alternatively rotationally fixed to the rear drive axle coaxial with the rear wheel and drivingly coupled to the drive unit 58 via chain sprockets (driven members) 18, 20 and stepper chains (driving chains) 24, 26 and outputs a drive force from the drive unit 58 to the rear wheel sprocket 30 via a transmission chain 28. The frame 12 has a housing 55 in which are housed some of the mechanics of the drive unit 58. The housing 55 is affixed to a lower portion of the down tube 46, to a lower portion of the seat tube 48, and front portions of the chain tube stays 50 through conventional methods, such as, for example, welding, brazing, bonding or suitable fasteners.

Figure 10:
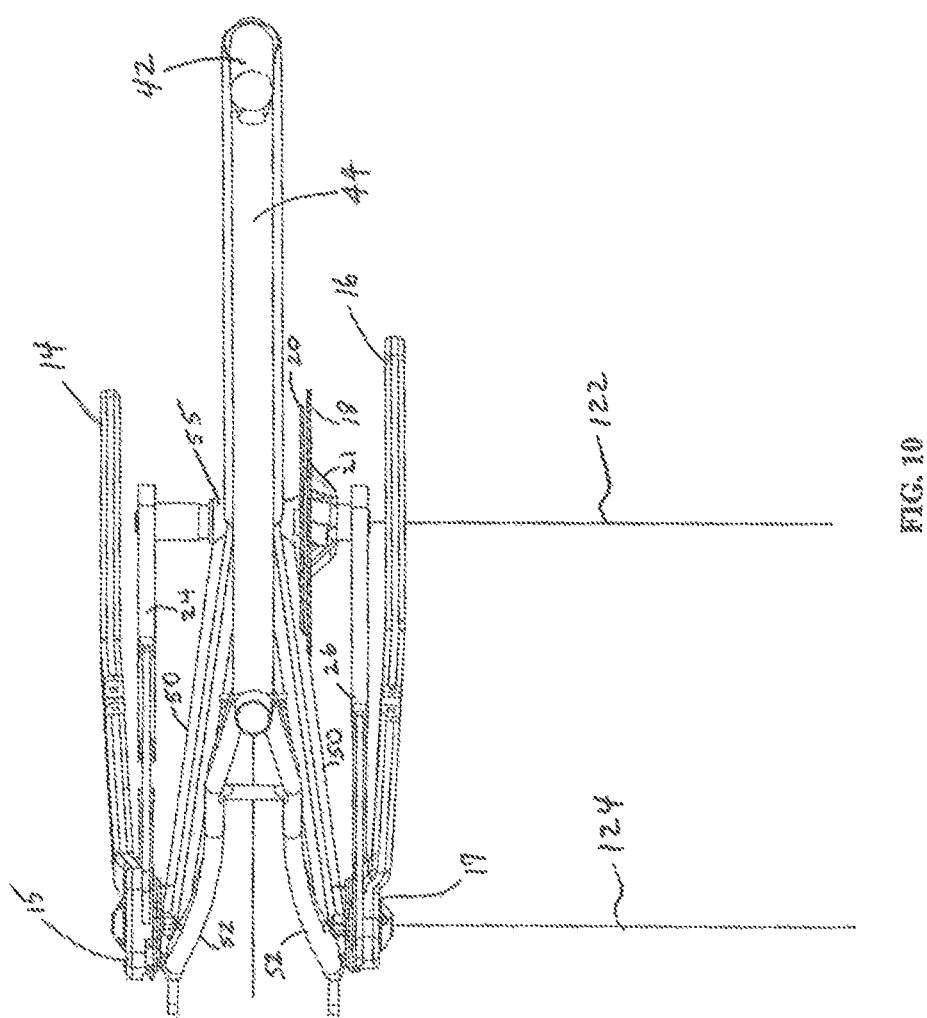
Figure 11:
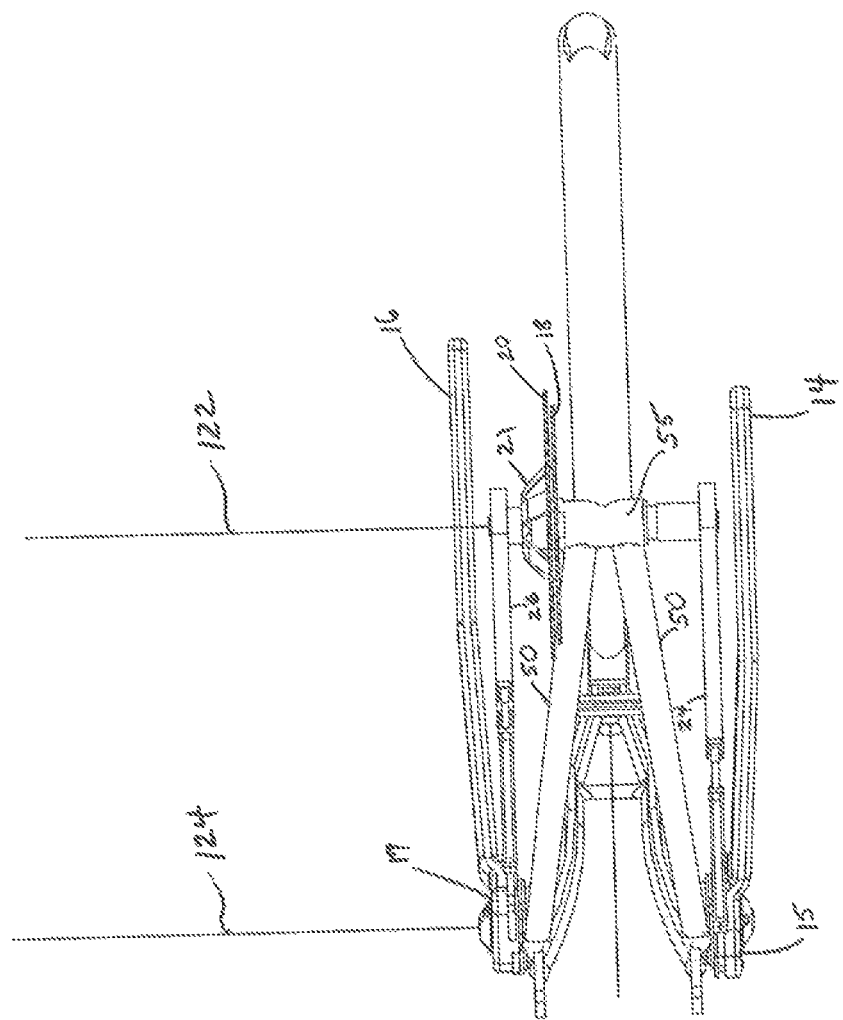
Figure 12:
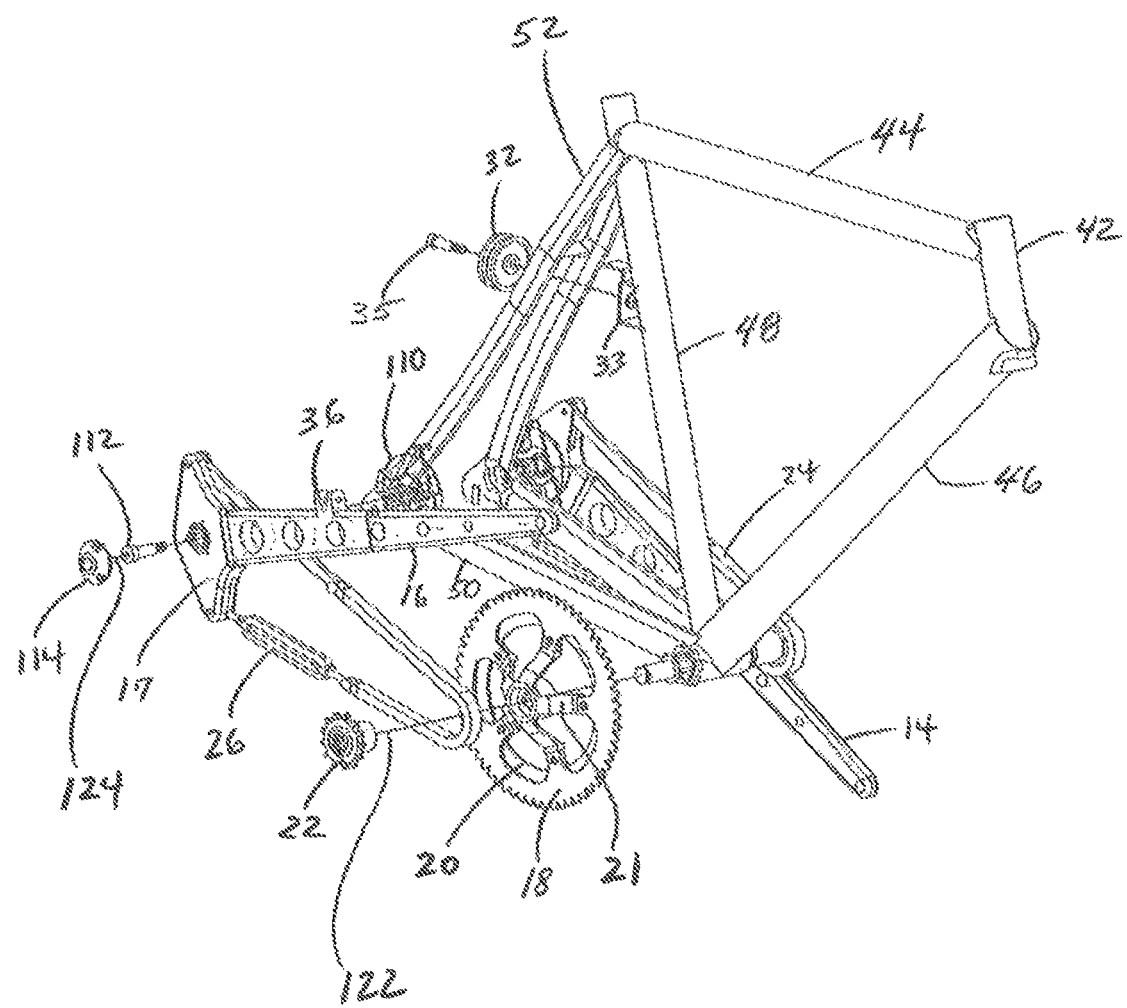
FIG. 12 is an exploded view of the rider-propelled vehicle incorporating the motion transfer mechanism of the invention.
Figure 13:
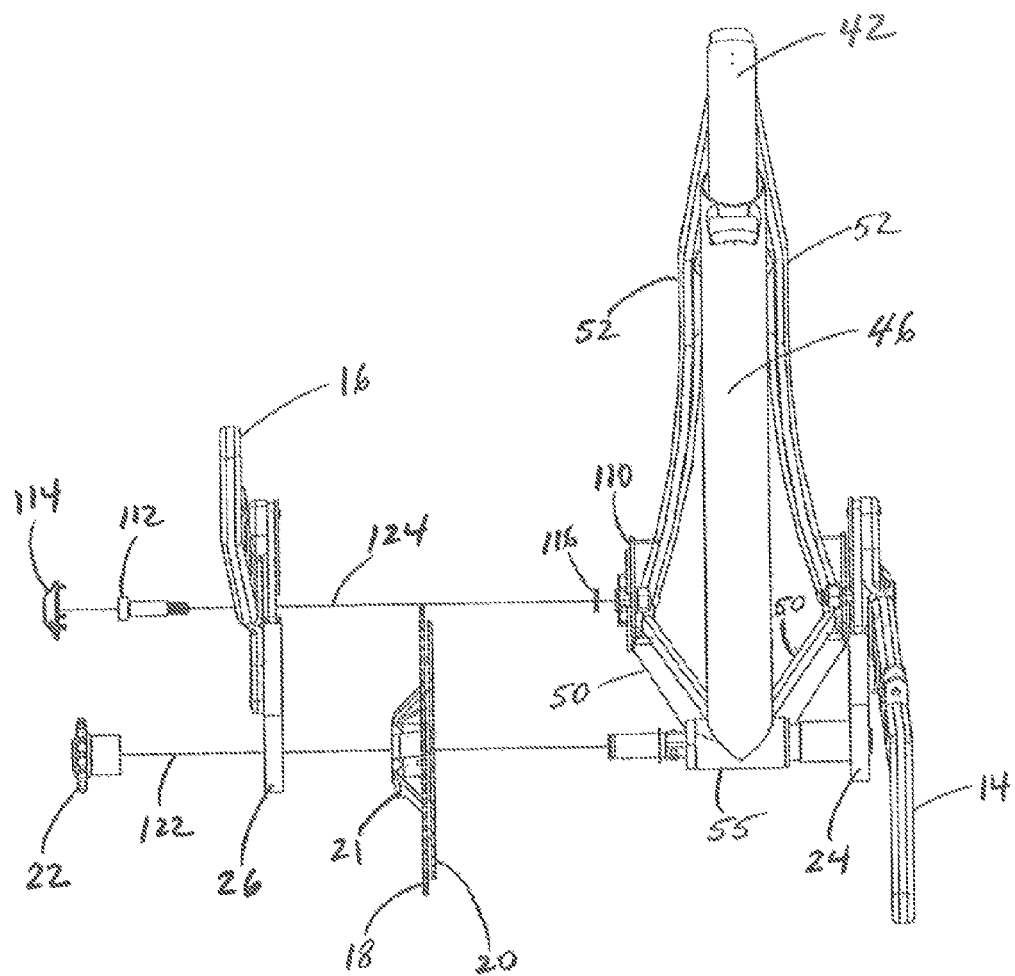
FIGS. 13-16 are front, rear, top and bottom exploded views, respectively, of the rider-propelled vehicle shown in FIG. 12.
Figure 14:
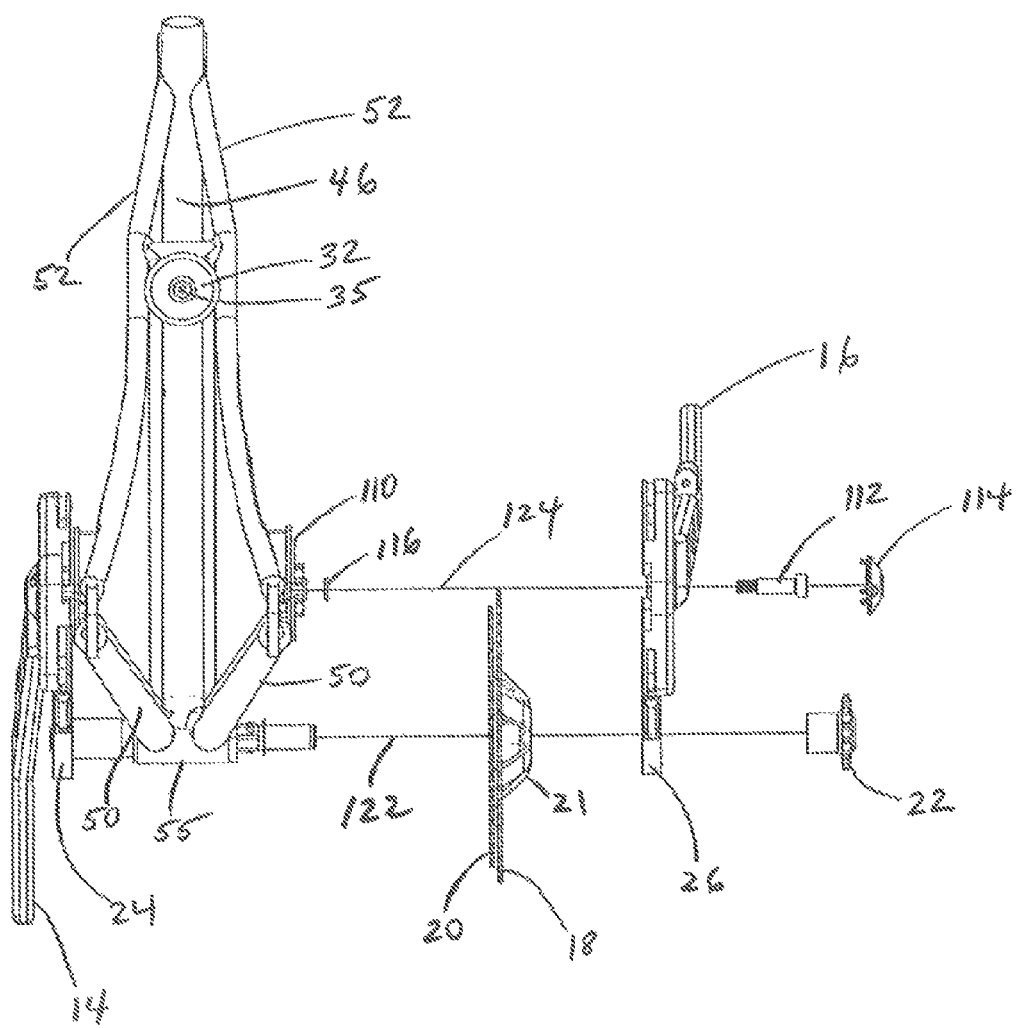
Figure 15:
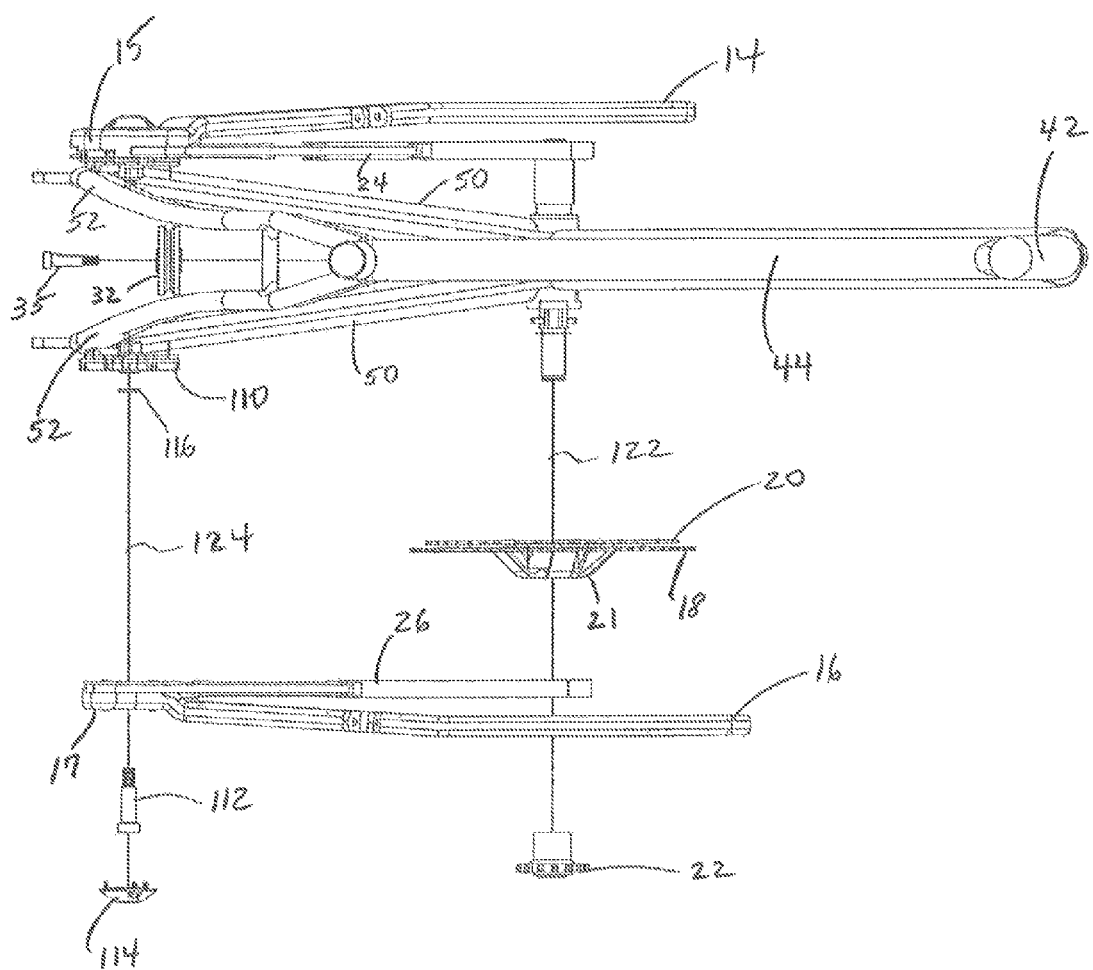
Figure 16:
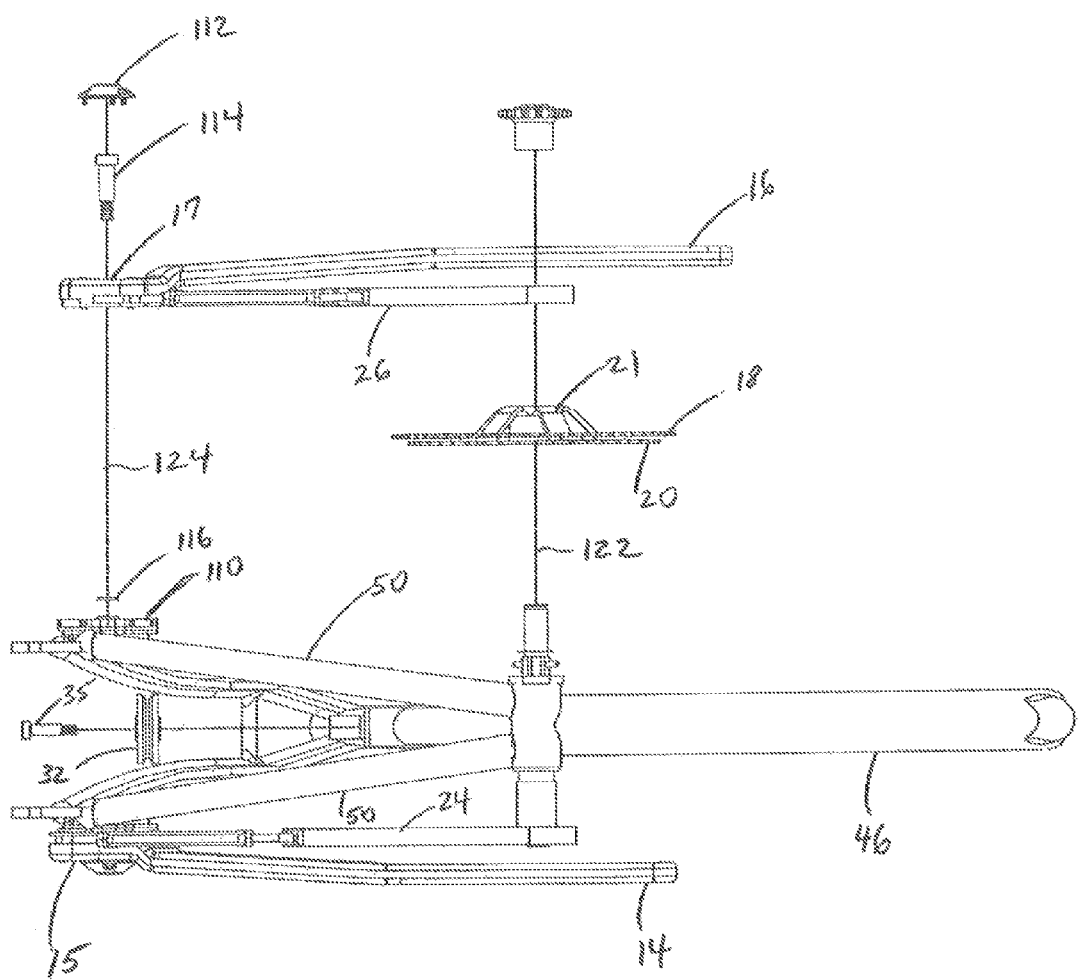
Figure 28:
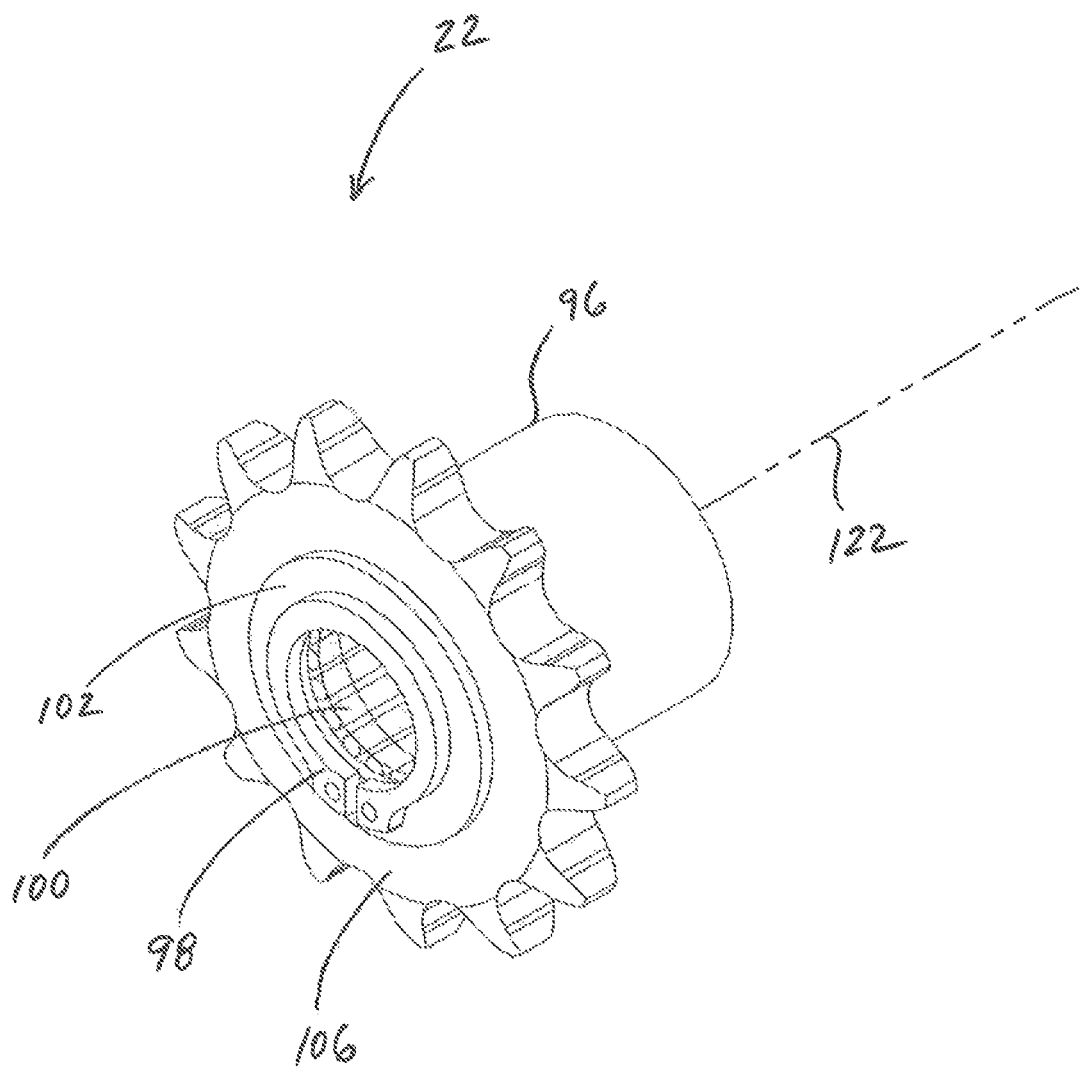
FIG. 28 is a perspective view of the cog unit in the motion transfer mechanism of the invention.
Figure 29:
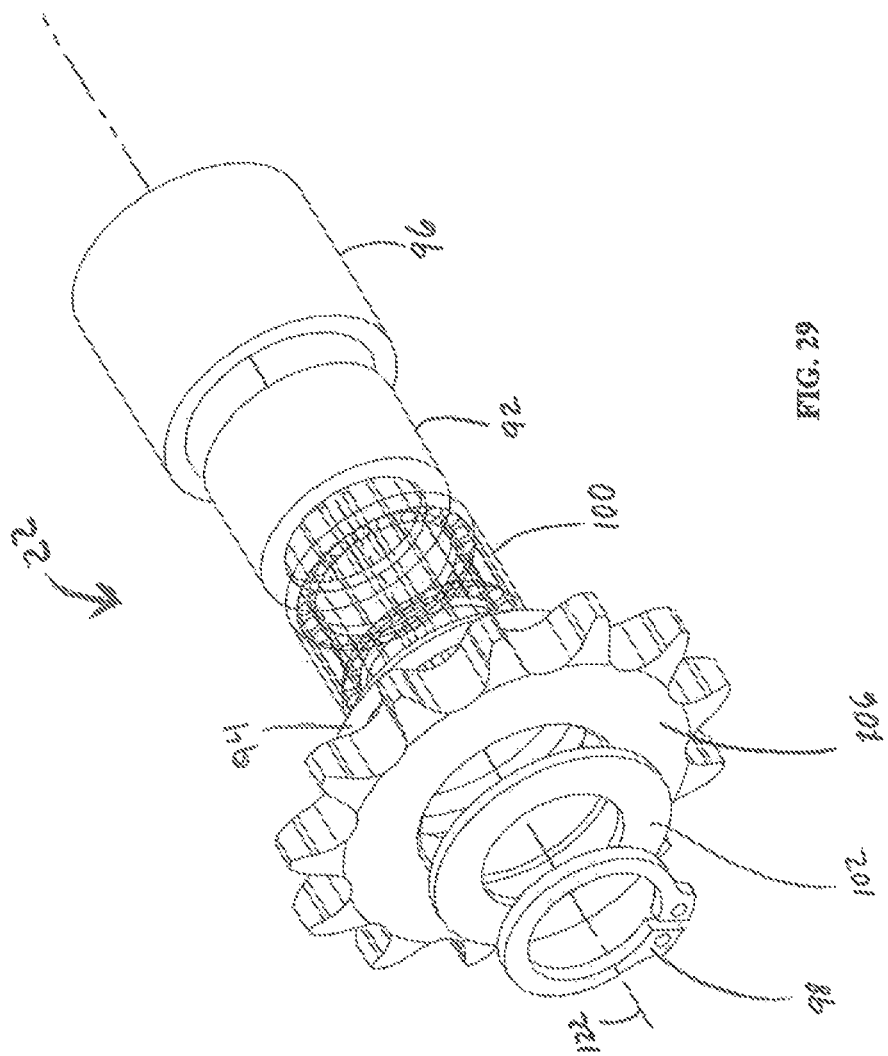
FIG. 29 is an exploded view of the cog unit shown in FIG. 28.
Figure 30:
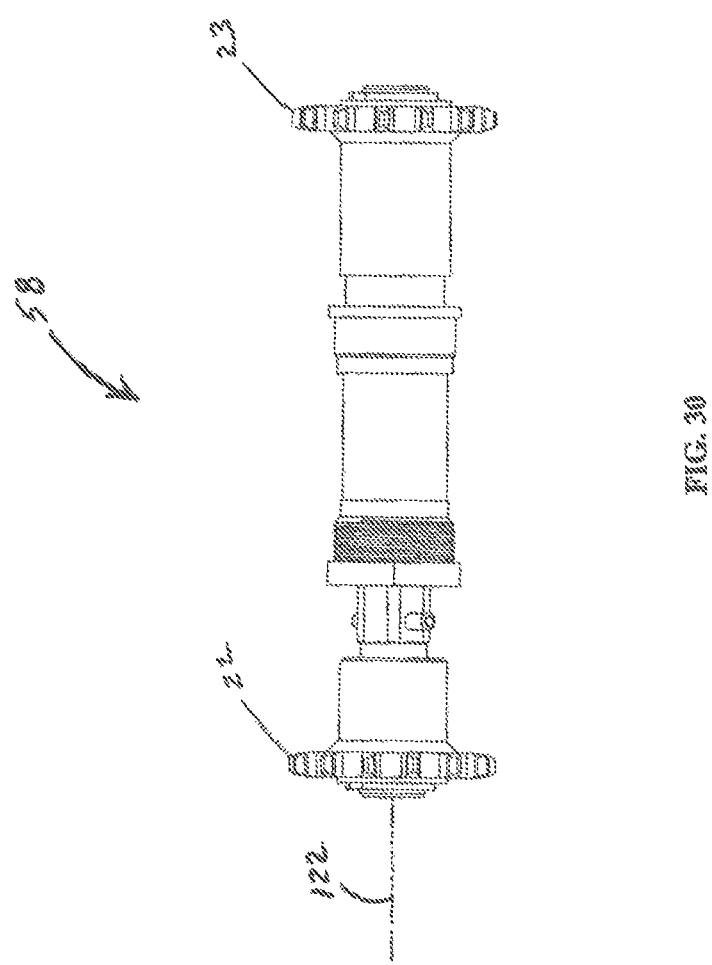
FIGS. 30 and 31 are a side view and a perspective view, respectively, of the assembled transmission unit in the motion transfer mechanism of the invention.
Figure 31:
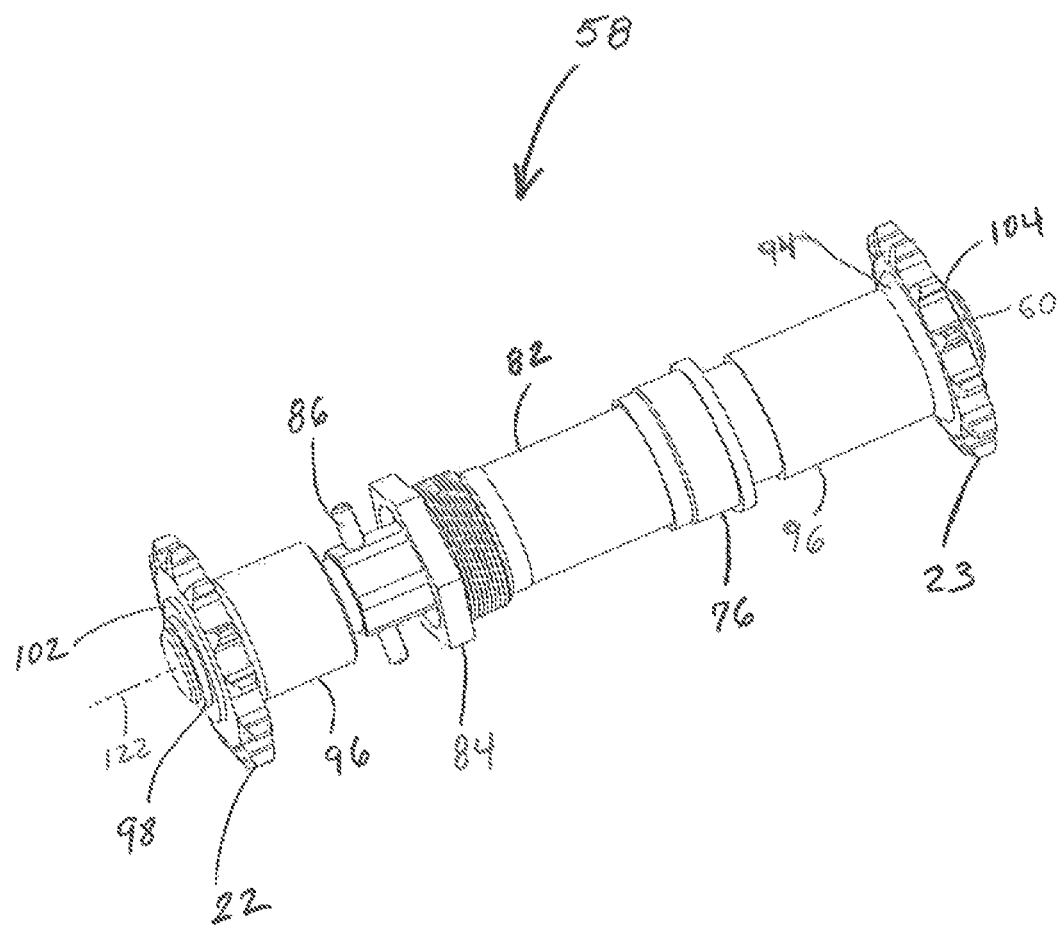
Figure 32:
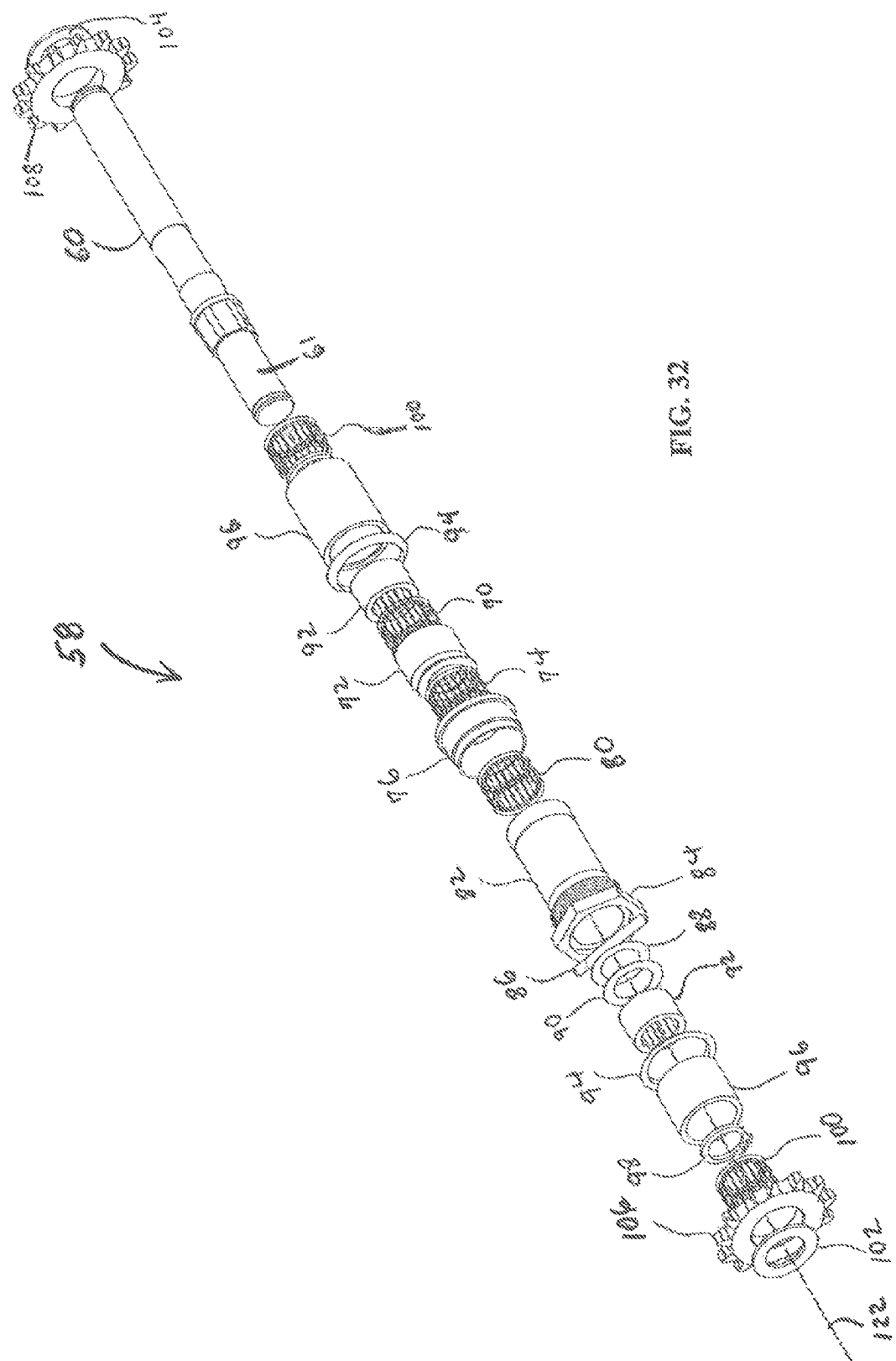
FIG. 32 is an exploded view of the transmission unit shown in FIG. 31.

Referring to FIGS. 28-32, the drive unit 58 has a rotary shaft 60 supported within an axial bore 56 by two bearings 70, 80 within the housing 55 and supports at opposite ends thereof right and left cog units 22, 23 having right and left pinions 106, 108, respectively, for undergoing reciprocal angular displacement about a second rotational axis 122 (second axis) which, as shown in FIGS. 10, 11 and 15, is disposed forwardly and parallel to the first rotational pivoting axis 124 of the crank arms 14, 16. By means of various components denoted by reference numerals 60-102 in FIGS. 31-32, such as transmission unit crank housing coupling components 76, 82 and coupling nut 84, the pinions 106, 108 are integrally connected to unidirectional clutch assemblies 92, 100 that encircle the rotary shaft 60 for effecting rotation of the rotary shaft 60 in only one direction of rotation (clockwise as viewed in FIG. 6). More specifically, the right and left pinions 106, 108 and corresponding unidirectional clutch assemblies 92, 100 are respectively integrally connected together to undergo angular displacement as units relative to the rotary shaft 60. As described below, the two unidirectional clutch assemblies 92, 100 alternately engage and disengage with rotary shaft 60 in response to reciprocal up-and-down movement of the crank arms 14, 16 to rotationally drive the rotary shaft 60 in one direction. FIGS. 28-29 show the right cog unit 22, including the pinion 106 and unidirectional clutch assembly 92, 100, as well as related connecting elements 94, 96, 98 and 102. As denoted in FIG. 32, the left cog unit 23 has a similar construction.

Figure 2:
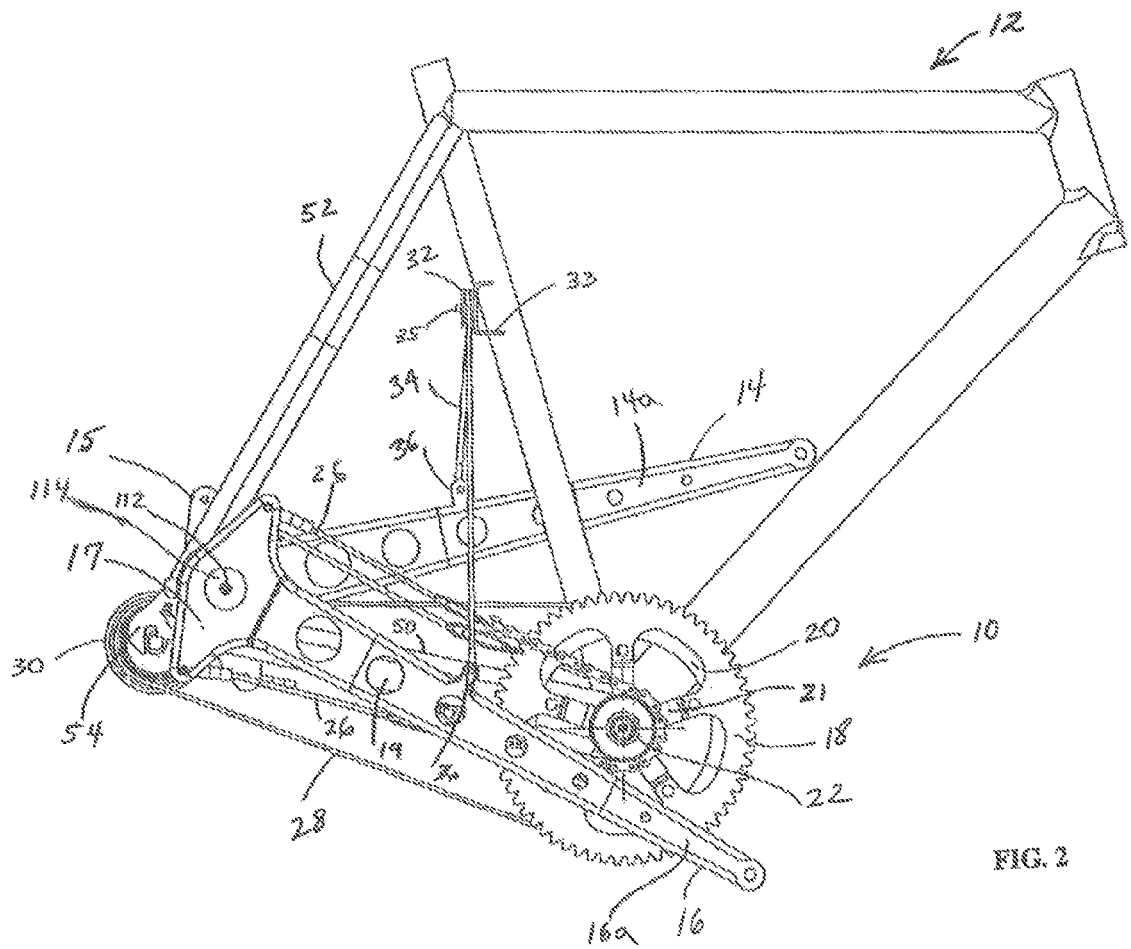
FIG. 2 is a right-side view of the rider-propelled vehicle shown in FIG. 1.
Figure 3:
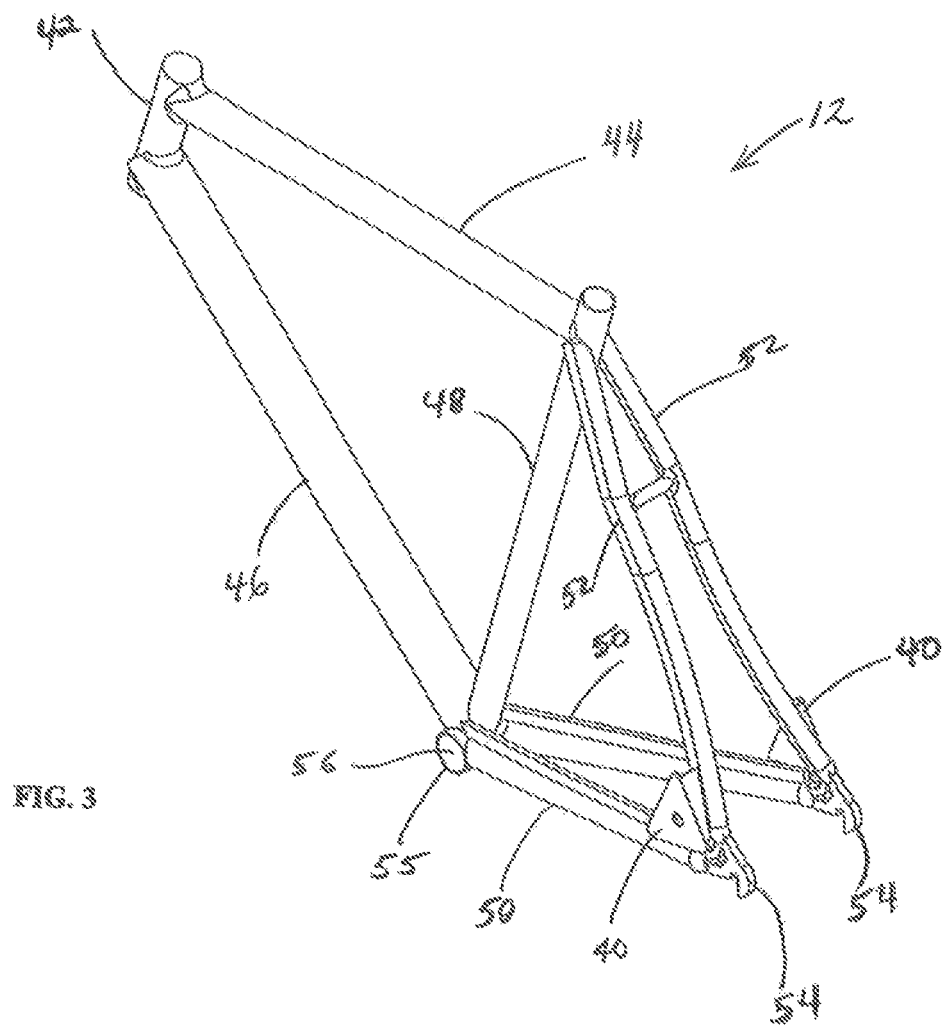
FIG. 3 is a perspective view of the bicycle frame on which the motion transfer mechanism of the invention is mounted.
Figure 4:
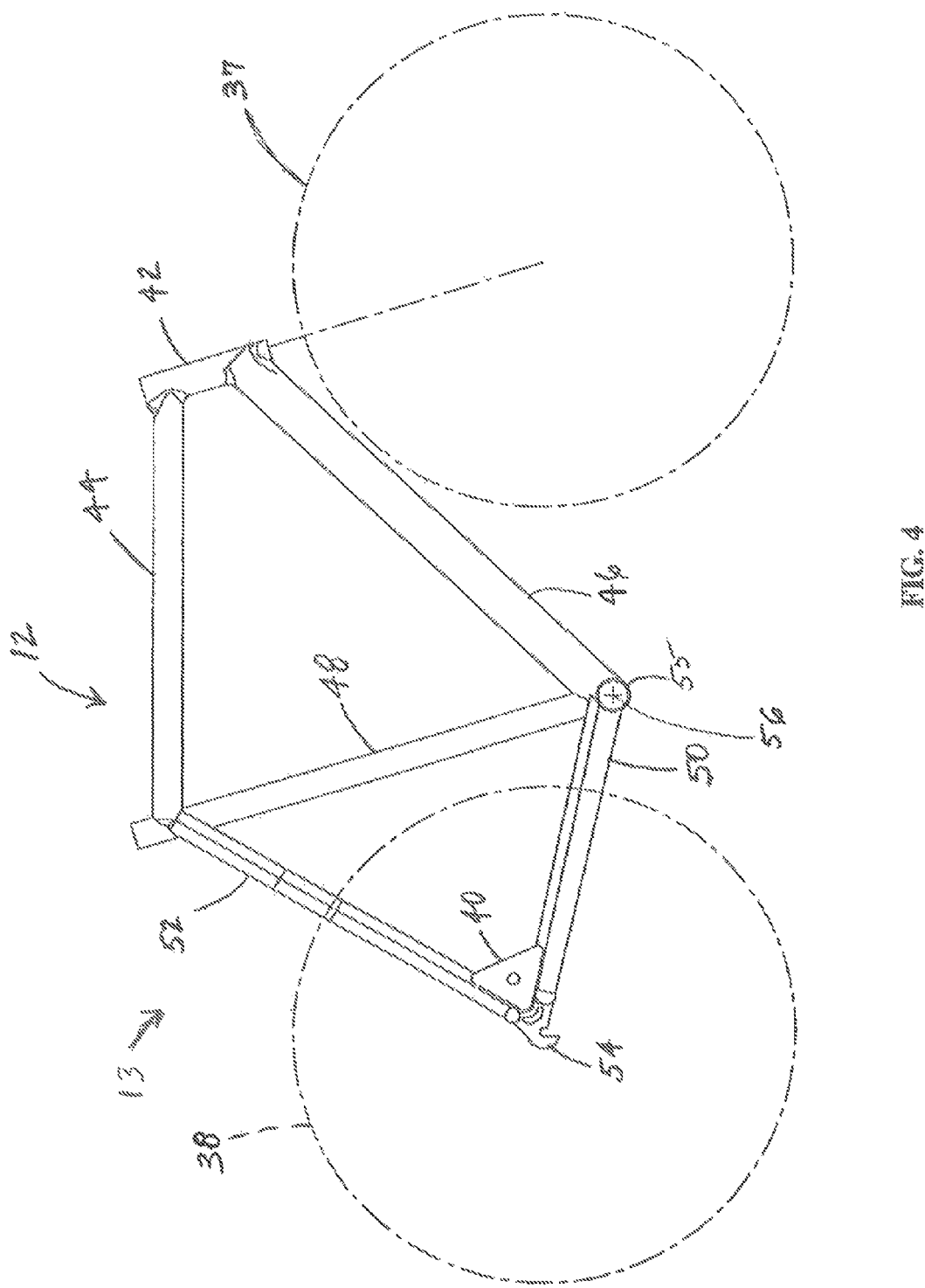
FIG. 4 is a right-side view of the bicycle on which the mechanism of the invention is mounted, with the wheels shown in dashed lines and with the motion transfer mechanism and certain parts of the bicycle omitted for clarity purposes.
Figure 5:
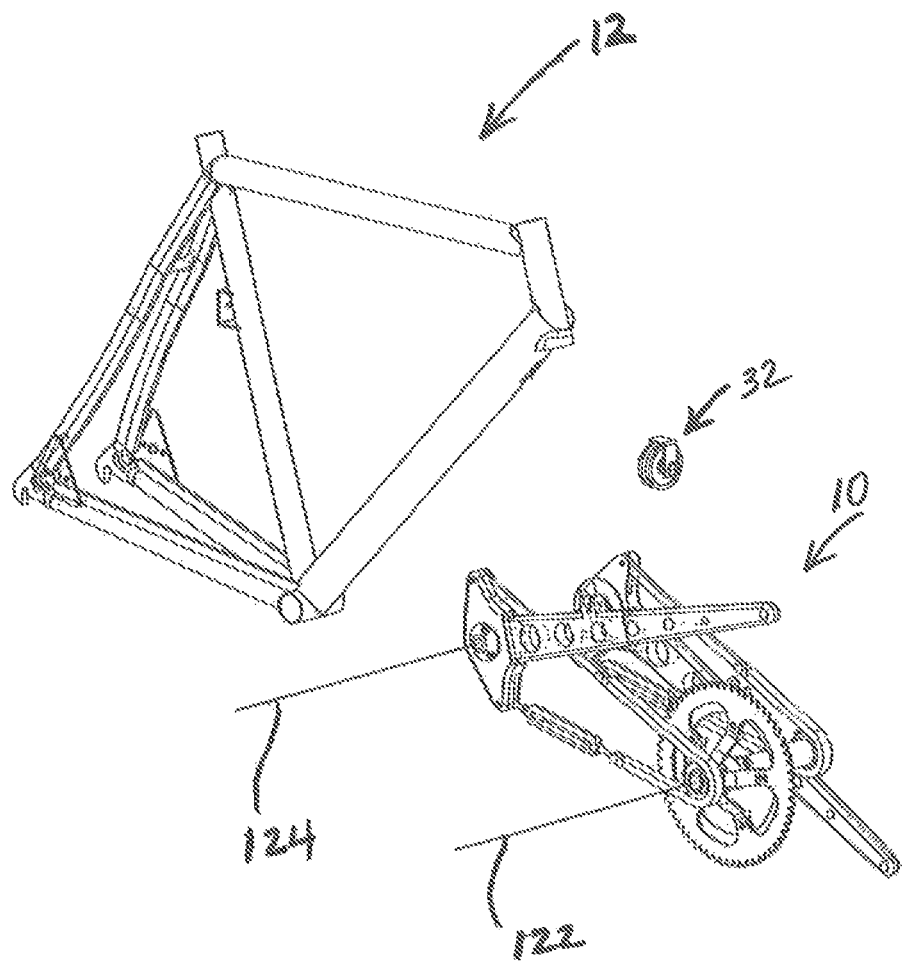
FIG. 5 is an explanatory view showing the motion transfer mechanism of the invention, the bicycle frame and the pulley of the return mechanism for crank arms (levers).
Figure 6:
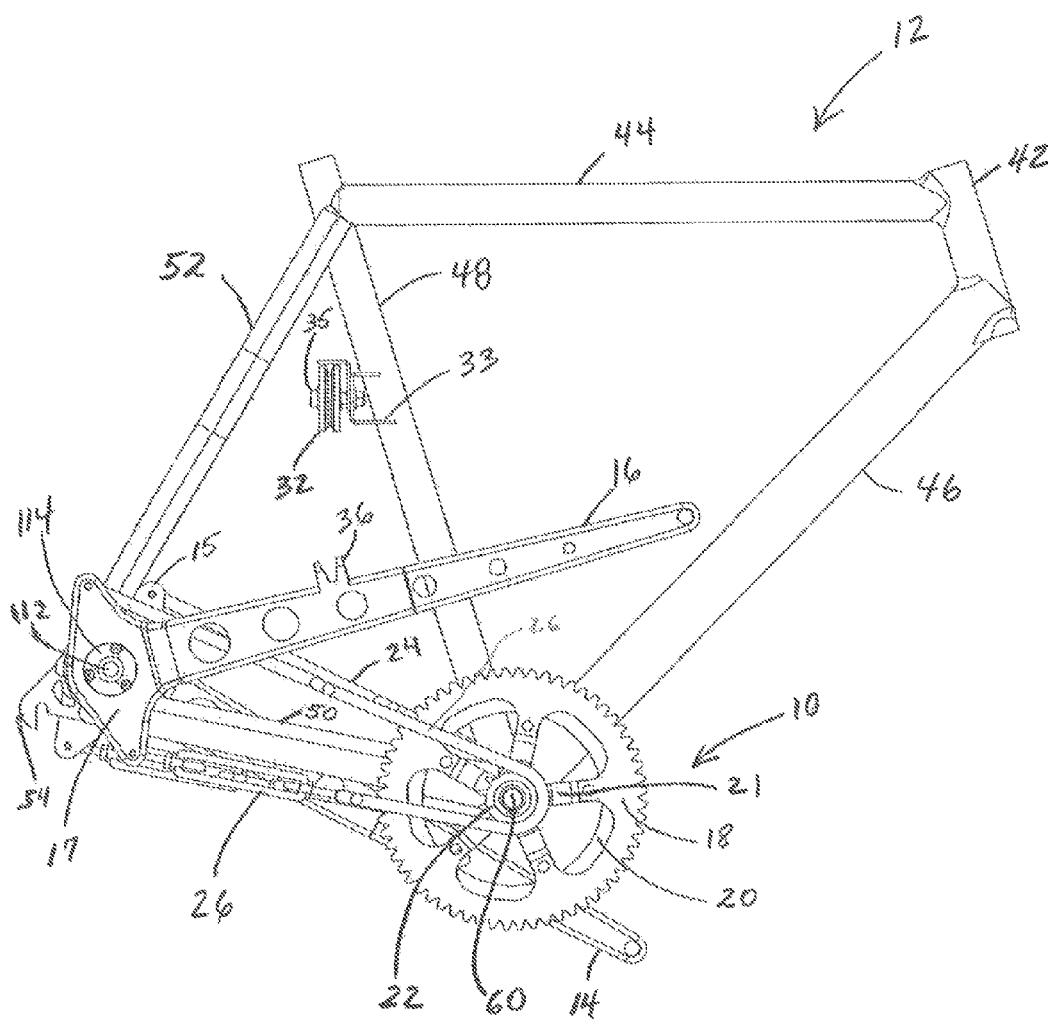
FIGS. 6-11 are right-side, left-side, front, rear, top and bottom views, respectively, of the rider-propelled vehicle incorporating the motion transfer mechanism of the invention.
Figure 7:
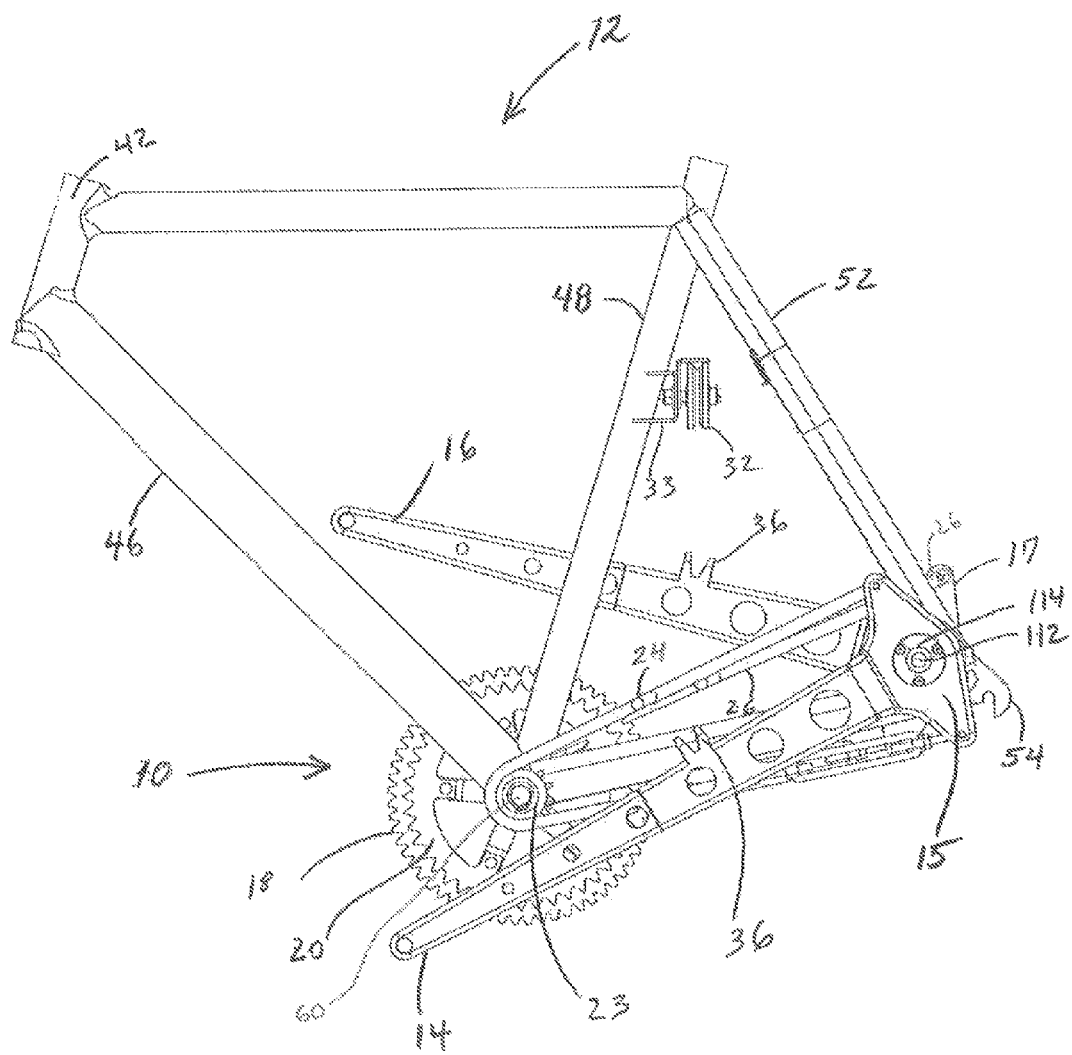
Figure 8:
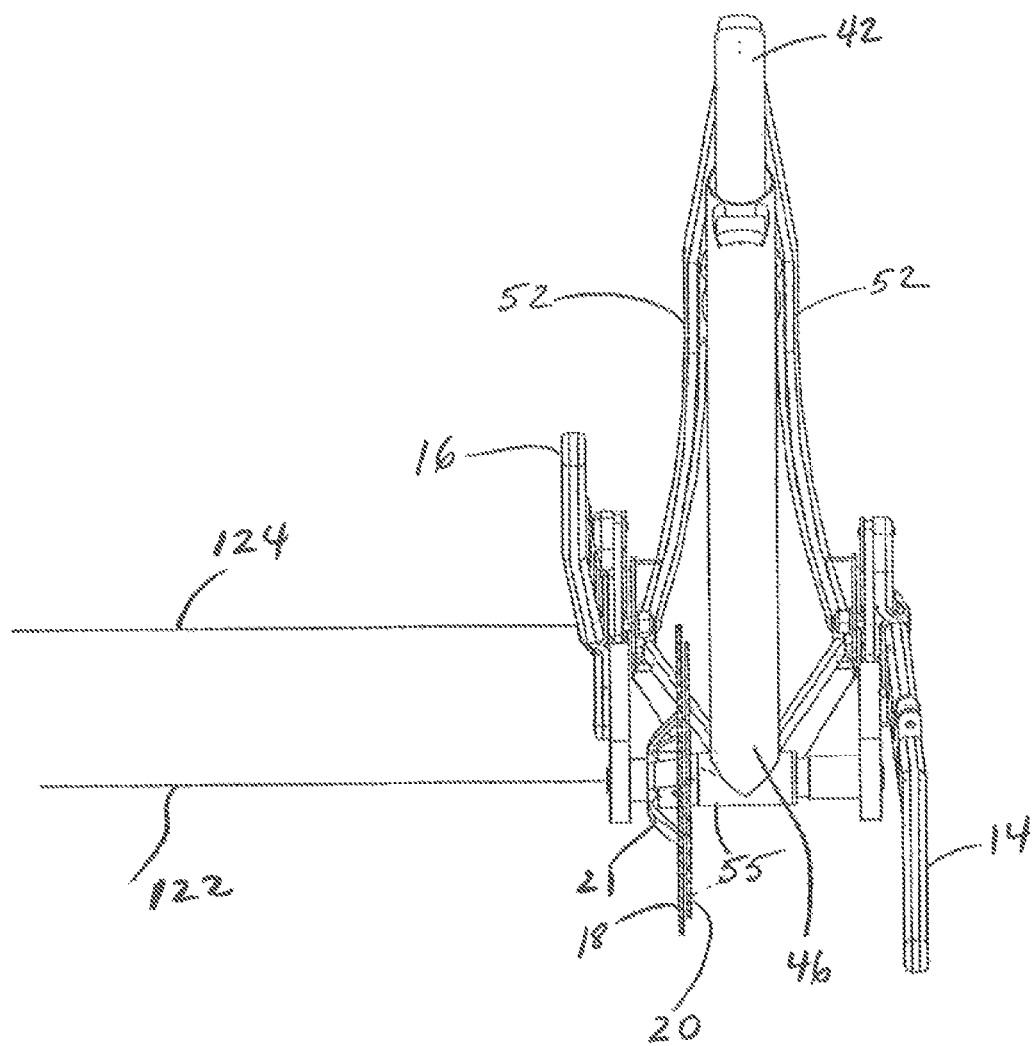
Figure 9:
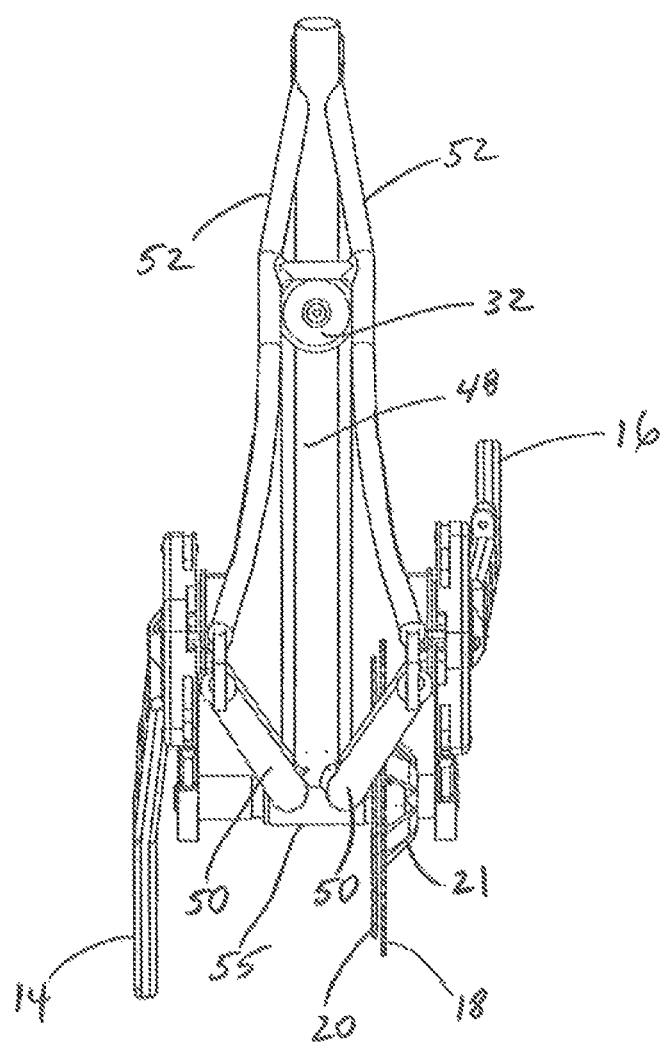
Figure 26:
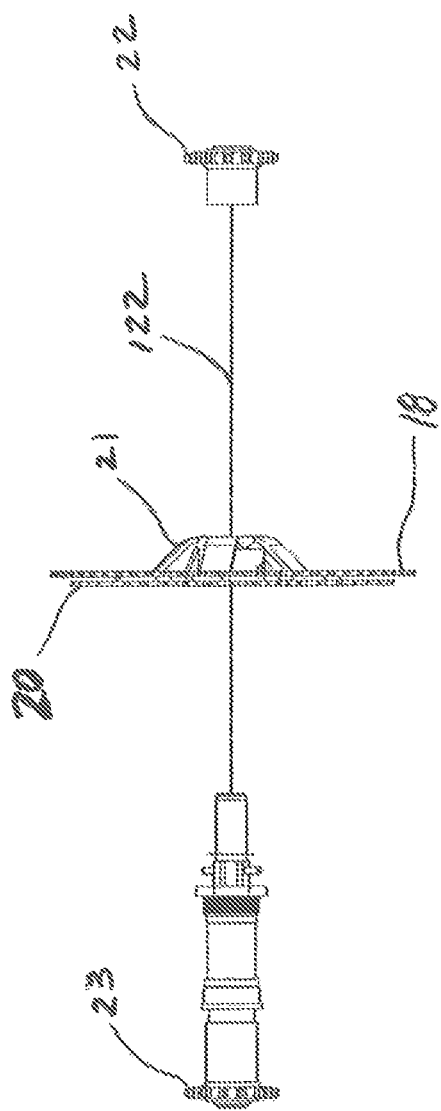
FIGS. 26-27 are partial exploded views showing the interconnection of the transmission and sprocket assemblies in the motion transfer mechanism of the invention.
Figure 27:
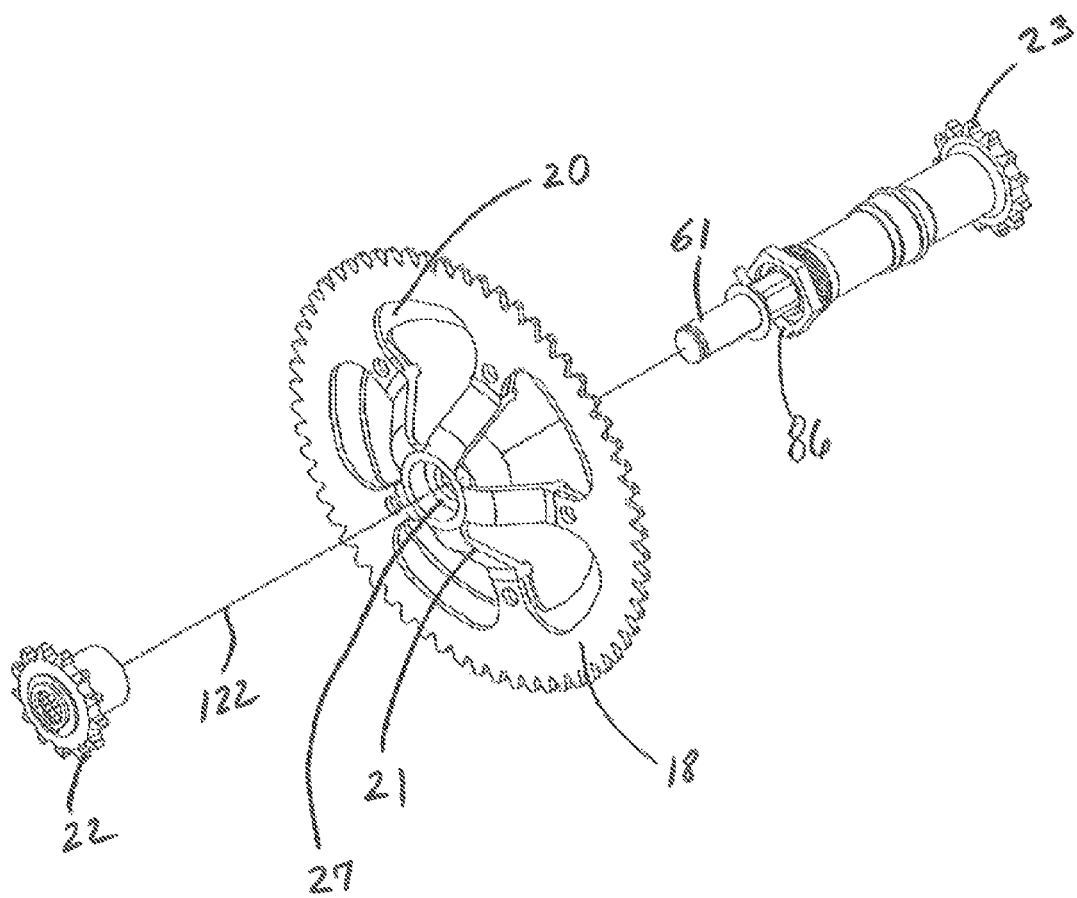

FIGS. 26-27 show the interconnection of the drive unit 58 with the chain sprockets (driven members) 18, 20 which are integrally connected to one another via a sprocket holder 21 (18, 20, 21 collectively referred to as "sprocket assembly" which includes a unidirectional clutch assembly 72, 74). The sprocket assembly (18, 20, 21) and washers 88 and 90 are connected to a right end portion 61 of rotary shaft 60 through a keying element 86 for rotation therewith in only one direction of rotation through the sprocket assembly clutch unit 72, 74 with the right end portion 61 of the rotary shaft 60 passing through a bore 27 of the sprocket assembly (18, 20, 21) and sprocket clutch assembly 72, 74 for connection to the right cog unit 22 as described above. As shown in FIGS. 1-2, transmission chain 28 connects sprocket assembly 18, 19, 21 to rear sprocket wheel 30 attached to the rear wheel 38 of the bicycle 13.

The transmission of the up-and-down reciprocal movement of the left and right crank arms 14, 16 is accomplished via left and right stepper chains (driving chains) 24, 26; respectively. More specifically, as shown in FIGS. 1, 2, 5, 7, 10, 11, 17 and 18, the right stepper chain (driving chain) 26 engages the right pinion 106 and has opposing ends connected to the pendulum 17 of the right crank arm 16 via suitable connectors. The left stepper chain (driving chain) 24 engages the left pinion 108 and has opposing ends connected to the pendulum 15 of the left crank arm 14 via suitable connectors.

In order to facilitate alternate reciprocal motion of the left and right crank arms 14, 16 during use of the bicycle 13, the crank arms are coupled together to undergo synchronous movement by a return mechanism 32, 34, such as a pulley-and-cable arrangement including a pulley 32 and pulley wire or cable 34, as shown in FIGS. 1 and 2. The pulley 32 is secured to the seat tube 48 of the bicycle frame 12 via a pulley wheel bracket 33 integral with the seat tube. The pulley wire 34 is connected at one end to a pulley wire holder 36 of the right crank arm 16 and passes up over the pulley 32 and then downwardly and is connected at its other end to the a pulley wire holder 36 of the left crank arm 14. By such an arrangement, when the left crank arm 14 is moved downwardly, the right crank arm 16 will be synchronously raised, and when the right crank arm 16 is moved downwardly, the left crank arm 14 will be synchronously raised. It will be appreciated by those skilled in the art that other lever return mechanisms which facilitate the alternate reciprocal motion of the crank arms 14, 16 during use of the bicycle may be used without departing from the spirit and scope of the invention.

The rotary shaft 60, the pinions 106, 108 and corresponding connecting elements are preferably formed of titanium or steel. The components of the unidirectional clutch assemblies 92, 100 are preferably formed of hardened chrome steel. However, it will be understood by those of ordinary skill in the art that other materials are suitable for the components of the drive unit. For example, some or all of the components of the drive unit 58 may be formed of a metal matrix or assorted variations of steel which exhibit a high ratio of strength to weight.

Operation of the motion transfer mechanism 10 to propel the bicycle 13 will be explained below with reference to FIGS. 1-7. Alternate actuation of one of the crank arms 14, 16 by the rider in a downward direction about the first rotational pivoting axis 124 raises the other of the crank arms 14, 16 via the return mechanism 32, 34. The bolt screw 112 of each crank arm 14, 16 allow the crank arm to travel in an up and down vertical motion. This motion allows the pendulums 15, 17 of the respective crank arms 14, 16 to act as fulcrums so as to transmit a driving force to the respective stepper chains (driving chains) 24, 26 engaged with the respective pinions 108, 106 of the cog units 23, 22. The engagement between the stepper chains 24, 26 and the pinions 108, 106, respectively, of the cog units 23, 22 causes the driving force transmitted to the stepper chains 24, 26 to effect angular displacements of the pinions 108, 106 in the one direction of rotation (for example, clockwise as viewed in FIGS. 1-2) about the second rotational axis 122. The drive forces of the pinions 108, 106 are transmitted by the corresponding clutch mechanisms 92, 100 to the rotary shaft 60, which is thereby continuously driven in the clockwise direction of rotation to rotationally drive the sprocket assembly (18, 20, and 21). As shown in FIGS. 1-2, the transmission chain 28, which passes over the sprocket assembly (18, 20, 21) and rear wheel sprocket 30, transmits the clockwise rotational motion of the sprocket assembly in the clockwise direction of rotation. On the other hand, upward motion of the crank arms 14, 16 is not transmitted to the rotary shaft 60. Instead, during upward strokes of the crank arms, the clutch assemblies 92, 100 de-clutch or disengage the pinions 108, 106 from the rotary shaft 60 so that the counterclockwise rotation of the pinions is not transmitted to the rotary shaft. Stated otherwise, the clutch assemblies 92, 100 freewheel relative to the rotary shaft 60 when the pinions 108, 106 and are angularly displaced in the counterclockwise direction. Furthermore, it will be appreciated that as a result of coupling the crank arms through the return mechanism 32, 34 as described above, the reciprocal back-and-forth motions of the crank arms are synchronized with each other, facilitating alternate reciprocal motion of the crank arms during use of the bicycle 13.

With the foregoing arrangement, it will be appreciated that reciprocal up-and-down motion of the crank arms 14, 16 by a rider will drive the rear wheel 38 of the bicycle 13 in a direction of rotation (e.g., in a clockwise direction as viewed in FIG. 4) to propel the bicycle 13 forwardly.

It will be appreciated by those skilled in the art that in the simplified construction of the motion transfer mechanism 10 according to this embodiment, the reciprocal up-and-down motion of the crank arms is accomplished without substantially increasing the overall size and weight of the bicycle. A compact and dynamically balanced motion transfer mechanism is achieved by disposing the unidirectional clutch assemblies 92, 100 within the pinions of the respective cog units 22, 23, and by disposing the rotary shaft 60, the pinions 108, 106, and clutch assemblies 92, 100 all coaxially with a single rotational axis (e.g., second rotational axis 122, as best shown in FIGS. 13-16, 21-22, 26-27 and 30-32). In addition to the foregoing feature, it will be understood that the stroke of the crank arms 14, 16 is not confined to any specific value except for the distance between the pulley 32 and the pulley wire holder 36 of each crank arm. Thus, a rider could alternate with various short strokes or could use the full stroke of each crank arm. This advantage is, in part, a consequence of utilizing independent left and right unidirectional clutch assemblies 92, 100 for driving the sprocket assembly (18, 20, and 21) which in turn drives the rear wheel 38 of the bicycle via the transmission chain 28.

Figure 33:
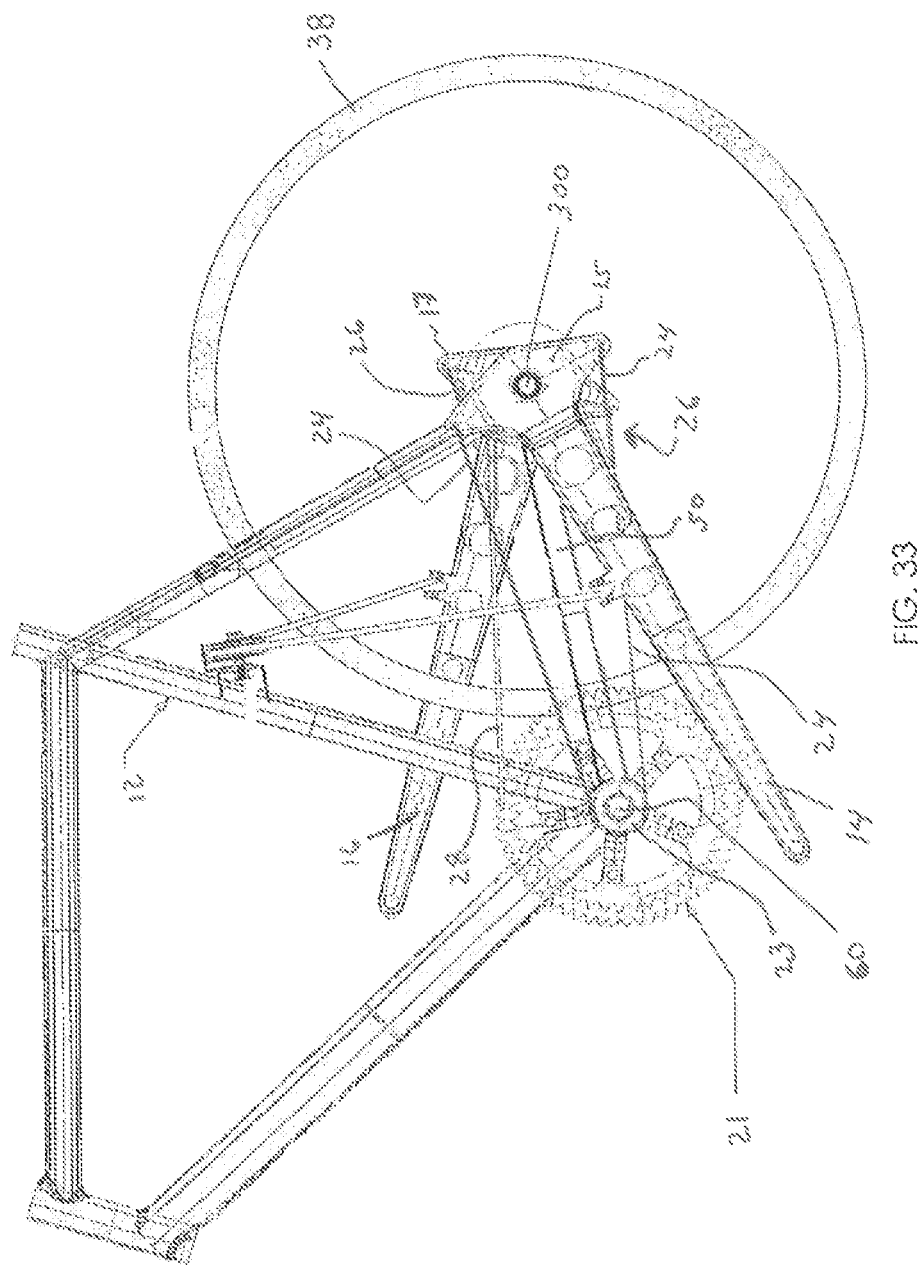
FIG. 33 shows a second embodiment of the invention in which the pivot or fulcrum point for the pendulum of each of the crank arms is placed directly on the rear drive axle (back wheel pivot) of the bicycle rear wheel.

A second embodiment of the motion transfer mechanism and bicycle according to the present invention is shown in FIGS. 33-35, in which the right and left pedal arms (crank arms 14, 16) pivot at the center of the rear wheel 38 of the bicycle. In this embodiment, the rear wheel 38 (with bicycle tire) is fixed to a rear drive axle 300 that has three (3) one-way clutch engagement points and free spins on two roller bearings 302 that are fixed to the bicycle frame 54 and engage the drive axle 300 on either side of the tire and a third roller bearing 304 fixed to the wheel rim. The right crank arm is fixed to a first clutch (#1) that engages and turns the rear axle 300 during down stroke of the right crank arm 16. The left crank arm 14 is fixed to a second clutch (#2) that also engages and turns the rear axle 300, thereby turning the rear wheel. The rear sprocket 30, which has chain linkage (transmission chain 28) connecting to the sprocket assembly (18, 20, 21), is fixed to a third clutch (#3) in selective operational connection to the rear wheel hub and the rear drive axle that engages and turns the rear axle 300. When the crank arms 14, 16 and third clutch 3 are activated, the third clutch 3 rotates at a higher RPM rate than the first and second clutches 1, 2, thereby taking priority and forcing the rear axle 300 to rotate faster than the first clutch and the second clutch (1, 2), thereby (freewheeling the first and second clutches 1, 2). For this reason, the third clutch 3 must be disengaged to the rear axle 300 when at a slower RPM and a higher torque is desired, allowing the bike to gain slow speed before engaging the third clutch 3 for higher speed. A method for achieving the foregoing result involves the manual engagement/disengagement of the third clutch 3. This can be done by manually switching the third clutch ON and OFF while riding the bike (pushing the crank arms). This is similar in function to a gear shifter or brake lever, which have a cable 400 routed remote control interface.

In the embodiment described above with reference to FIGS. 1-32, the right and left crank arms 14, 16 are mounted for undergoing reciprocal pivotal movement about first rotational axis 124 extending through a general center of respective mounting brackets 40 integrally connected to bicycle frame 12 at respective angular junctions between respective chain tube stays 50 and seat tube stays 52. In the second embodiment described above with reference to FIGS. 33-35, the right and left crank arms 14, 16 are mounted for undergoing reciprocal pivotal movement about a first rotational axis 124; alternatively extending through a rear drive axle 300 at the center of the rear wheel 38 of the bicycle. However, it is understood by those skilled in the art that the crank arms may be mounted on the bicycle frame for undergoing pivotal movement about a first rotational axis located at a position other than as described above for the foregoing embodiments. For example, the crank arms may be mounted at other suitably positions along the chain tube stay or seat tube stay of the bicycle frame for undergoing reciprocal pivotal movement.

From the foregoing, it will be appreciated by those skilled in the art that the unidirectional drive of the rear chain sprocket 30 provides for the stepping drive of the rider-propelled vehicle in which the driving action is accomplished with a more efficient delivery of force as compared, for example, with the average force delivered in the case of a conventional bicycle. More specifically, in conventional bicycles the rider pedals in a circular motion to propel the bicycle forward while remaining in a seated position most of the time because if he attempts to stand, he must position his body by holding onto the handle bars, thereby rendering the driving operation inefficient. The motion transfer mechanism 10 of the present invention, on the other hand, transmits and leverages the force applied by the rider at the rear of the bicycle, thus allowing the rider to transmit his entire body weight directly to the crank arms. This force is transmitted to the pendulums 15, 17 at the rear of the respective crank arms, thereby enhancing the driving efficiency.

Moreover, in conventional bicycles in which riders pedal in a circular motion to propel the bicycle, the rider is unable to obtain speeds (RPM) in excess of 120 RPM. This limitation in such conventional bicycles is due to the fact that a rider is unable to spin his legs continuously for a very long period of time as it causes the rider to become exhaustive. In contrast, with the bicycle employing the motion transfer mechanism according to the present invention, the rider is able to apply a force directly to the crank arms, thus allowing the rider to use the most efficient muscles in his body to propel the bicycle forward. Additionally, the motion transfer mechanism of the present invention allows the rider to leverage his force to thereby spin the sprocket assembly with higher efficiency as compared to the conventional bicycles. In this regard, since the pivoting axis of the crank arms of the motion transfer mechanism is spaced-apart from and positioned rearwardly of the rotational axis of the sprocket assembly, the rider is able to produce more than double the RPM as that achieved with the conventional bicycles. The motion transfer mechanism of the present invention allows the rider to apply more than 93% of its weight directly to the crank arms, as compared to 63% for conventional bicycles.

Another advantage of the motion transfer mechanism according to the present invention is that the stroke of the crank arms is not confined to any specific value. Thus a rider can use various short strokes or could use the full stroke of each crank arm. This advantage is in part a consequence of utilizing left and right unidirectional clutch assemblies for driving the rotary shaft and chain sprocket assembly which in turn drive, for example, the rear wheel of the bicycle via the transmission chain.

Thus the motion transfer mechanism according to the present invention: (a) converts reciprocal motion to rotary motion in a manner which avoids the drawbacks and disadvantages of prior constructions; (b) effectively converts reciprocal motion applied to pivoted crank arms to rotary motion of an output member without requiring the application of substantial force; (c) transfers reciprocal motion of a pair of pivoted crank arm to rotary motion to propel a rider-propelled vehicle or to operate an exercise apparatus with efficient transfer of applied power and reduced resistance to power transfer; (d) converts reciprocal motion applied to pivoted crank arms to rotary motion smoothly and with uniform transmission of force independent of the speed of the rider-propelled vehicle or exercise apparatus; (e) exhibits improved transmission of force and the mechanical advantage that reduce the effort which must be expended by the rider; and (f) has a construction that avoids unduly complicated driving systems and the attendant substantially increase in size and weight.

A major advantage of the stepper bicycle using the motion transfer mechanism according to the foregoing embodiments of the present invention is that it allows the rider freedom of choice. In its standard setting, the force applied to the crank arms (pedals) by the rider's vertical stepping motion is transferred directly to the rear wheel or cassette of the bicycle (the rear of the bicycle is where the pendulum-fulcrum mechanism is located). A switch may be incorporated which may be selectively switched by the rider such that the rider's application of force is transferred from the rear of the bicycle to the chain. This could be accomplished via a switch or by automatic operation depending on the device that is placed at the rear of the wheel. The force will then be transferred by the chain to a frontal one-directional clutch. Any number of one-directional mechanisms, pulley-type machines, etc., can be substituted for the clutch.

There is also a commonality between all rider-propelled vehicles to which the motion transfer mechanism according to the foregoing embodiments of the present invention are incorporated. Whether it be a bicycle, tricycle, wheelchair, paddleboat, hydro-bike, or three-wheeled vehicle, each rider-propelled vehicle is driven by one or more one-directional clutches, which can either be foot-driven or hand-driven.

From the foregoing description, it can be seen that the present invention comprises an improved mechanism for converting reciprocal to rotary motion. It would be appreciated by those skilled in the art that obvious changes can be made to the embodiment described in the foregoing description without departing from the broad inventive concept thereof. For example, although the foregoing embodiment of the mechanism has been described with a specific application to a bicycle, it will be appreciated that the foregoing embodiment is also particularly well adapted for other types of rider-propelled vehicles, such as, for example, small recreational cars, paddle boats, light-weight airplanes, tandem vehicles and other similarly operated vehicles, as well as other applications, such as, for example, conventional exercise apparatus including stair climbers, stationary bicycles and other physical conditioning devices. Additionally, the foregoing embodiment may be assembled on the rider-propelled vehicle in a manner which requires operation by alternate forward and backward movement of the levers instead of upward and downward movement. It is understood, therefore, that this invention is not limited to the particular embodiments disclosed, but is intended to cover all modifications thereof which are within the scope and the spirit of the invention.

What is claimed is:

1. A rider-propelled vehicle comprising:
a frame, a wheel rotatably coupled to said frame,
a first drive axle rotatably mounted to said frame about a first drive axis,
said first drive axle rotatably fixed to said wheel for drivingly rotating said wheel and said first drive axle in a forward direction to propel said vehicle forward,
a pair of opposing reciprocating lever arms comprising a left side rider-actuated lever arm and right side rider-actuated lever arm which are disposed perpendicular to said first drive axis and pivotally coupled coaxial to said first drive axis to selectively rotate the lever arms with the first drive axle in a forward direction, wherein said left lever arm is rotatably coupled to said first drive axle through a first one-way clutch, and said opposing reciprocating right lever arm is rotatably coupled to an opposing end portion of said first drive axle through a second one-way clutch, wherein said first drive axle may rotate in said forward direction and rotatably drive said wheel when said pair of lever arms are driven downwardly in a reciprocating motion, and wherein said first and second clutches of said opposing lever arms allow said first drive axle to freely spin on said left and right lever arms when said pair of lever arms are actuated in an upward reciprocating direction by a downward driving of the opposing left and right lever arm, each said lever arm of said pair of lever arms further comprise a driving chain interconnected with a drive unit, said drive unit comprises: a second drive axle having a second drive axis disposed parallel to said first drive axis and spaced from said first drive axle, a left side one-way clutch driven cog unit drivingly connected to said left driving chain of said left driven lever arm, a right side one-way clutch driven cog unit drivingly connected to said right driving chain of said right driven lever arm, and a drive sprocket assembly, said first drive axle further comprises a wheel sprocket rotatably coupled to said first drive axle, said wheel sprocket selectively coupled to said drive unit through a transmission chain, wherein a rotational driving force from a downward rotation of each said lever arm through each said driving chain to said drive unit is selectively coupled to said wheel sprocket through said transmission chain by selective engagement of a third clutch disposed on one of said first and second drive axles, so as to drivingly rotate said first drive axle in said forward direction, said drive sprocket assembly of said drive unit comprising a sprocket diameter that is larger than said wheel sprocket, wherein said drive sprocket assembly is rotated at a higher rate of rotation when said third clutch is selectively engaged, thereby rotating said first drive axle at a higher rotational speed than said drive force from said downward driven levers arms and will cause the first drive axle to freely spin about said lever arms through said first and second one-way clutches and rotate said wheel at a higher speed than when driven by the lever arms alone.

2. The rider-propelled vehicle according to claim 1; further comprising a return mechanism coupling the driving rider-actuated levers for reciprocal pivotal movement.

* * * * *